US011647453B2

(12) United States Patent
Jin et al.

(10) Patent No.: US 11,647,453 B2
(45) Date of Patent: May 9, 2023

(54) METHOD AND APPARATUS FOR TRANSMITTING NETWORK INFORMATION IN WIRELESS COMMUNICATION SYSTEM

(71) Applicant: Samsung Electronics Co., Ltd., Suwon-si (KR)

(72) Inventors: Seungri Jin, Suwon-si (KR); Soenghun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/229,115

(22) Filed: Apr. 13, 2021

(65) Prior Publication Data

US 2021/0329543 A1 Oct. 21, 2021

(30) Foreign Application Priority Data

Apr. 13, 2020 (KR) .......................... 10-2020-0044787
Apr. 13, 2020 (KR) .......................... 10-2020-0044789

(51) Int. Cl.
| | |
|---|---|
| *H04W 48/18* | (2009.01) |
| *H04J 11/00* | (2006.01) |
| *H04W 48/20* | (2009.01) |
| *H04W 64/00* | (2009.01) |
| *H04W 76/27* | (2018.01) |
| *H04W 48/16* | (2009.01) |

(52) U.S. Cl.
CPC ......... *H04W 48/18* (2013.01); *H04J 11/0079* (2013.01); *H04W 48/16* (2013.01); *H04W 48/20* (2013.01); *H04W 64/00* (2013.01); *H04W 76/27* (2018.02)

(58) Field of Classification Search
CPC ..... H04W 48/18; H04W 48/16; H04W 48/20; H04W 64/00; H04W 76/27; H04W 48/12; H04J 11/0079
See application file for complete search history.

(56) References Cited

U.S. PATENT DOCUMENTS

2009/0247163 A1* 10/2009 Aoyama ............... H04W 48/10
 455/436
2013/0010716 A1* 1/2013 Dinan ................... H04W 76/15
 370/329

\* cited by examiner

Primary Examiner — Diane D Mizrahi
(74) Attorney, Agent, or Firm — Jefferson IP Law, LLP

(57) ABSTRACT

A method, performed by a user equipment (UE), for accessing a cell is provided. The method includes receiving, from a base station, system information block 1 (SIB1) including cellAccessRelatedinfo, selecting a public land mobile network (PLMN), selecting a cell, based on the selected PLMN, determining whether to update a tracking area (TA), based on the selected cell and PLMN-identityinfo included in the cellAccessRelatedinfo, based on determining to update the TA, performing TA update, transmitting, to the base station, a radio resource control (RRC) setup request message, receiving, from the base station, an RRC setup message, and transmitting, to the base station, an RRC setup complete message.

8 Claims, 11 Drawing Sheets

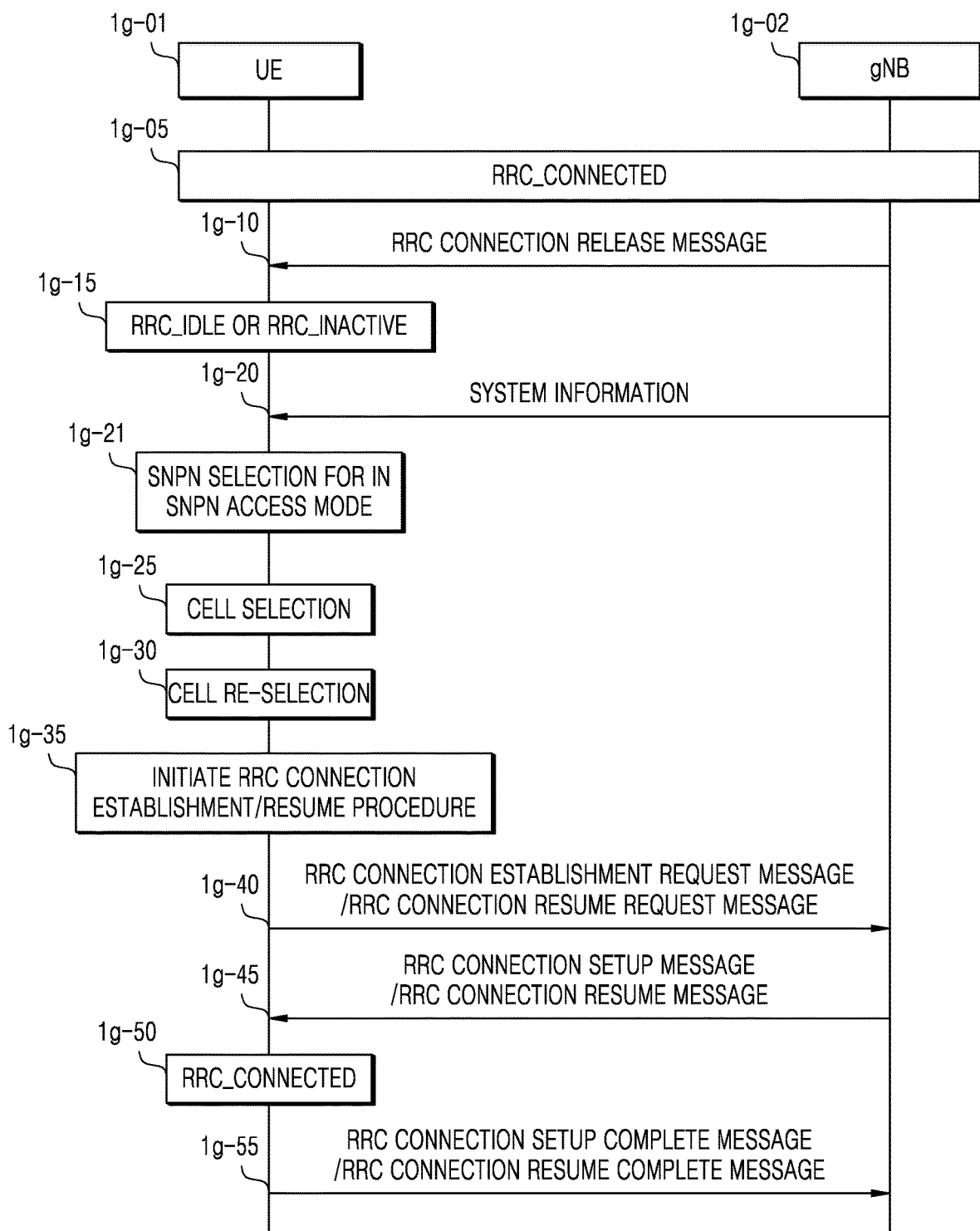

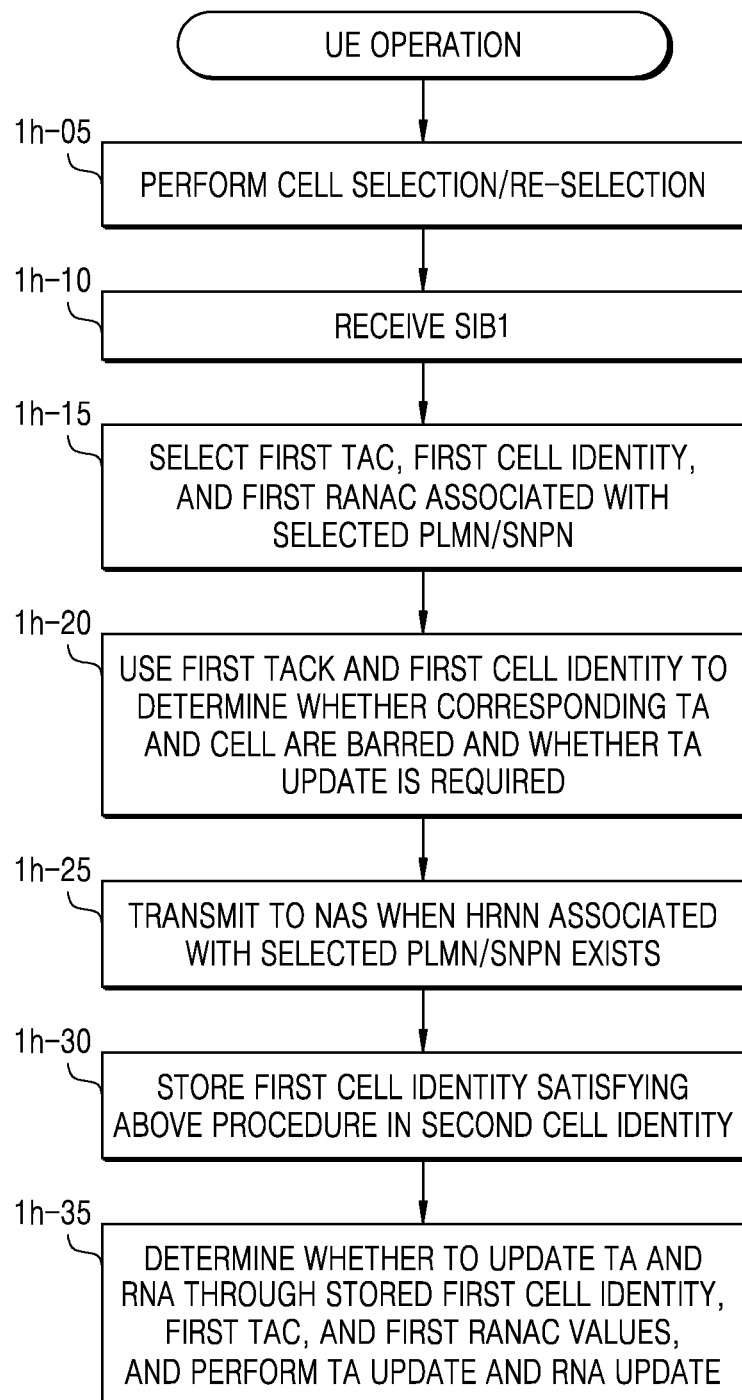

METHOD AND APPARATUS FOR TRANSMITTING NETWORK INFORMATION IN WIRELESS COMMUNICATION SYSTEM

CROSS-REFERENCE TO RELATED APPLICATION(S)

This application is based on and claims priority under 35 U.S.C. § 119(a) of a Korean patent application number 10-2020-0044787, filed on Apr. 13, 2020, in the Korean Intellectual Property Office, and of a Korean patent application number 10-2020-0044789, filed on Apr. 13, 2020, in the Korean Intellectual Property Office, the disclosure of each of which is incorporated by reference herein in its entirety.

BACKGROUND

1. Field

The disclosure relates to a mobile communication system. More particularly, the disclosure relates to a method of processing a terminal initial access between a base station and a terminal.

2. Description of Related Art

To meet the increase in demand with respect to wireless data traffic after the commercialization of $4^{th}$ generation (4G) communication systems, considerable efforts have been made to develop improved $5^{th}$ generation (5G) communication systems or pre-5G communication systems. For this reason, 5G communication systems or pre-5G communication systems are called beyond 4G network communication systems or post long term evolution (LTE) systems. To achieve a high data rate, the implementation of 5G communication systems in an ultra-high frequency band (millimeter wave (mmWave)) (e.g., a 60 GHz band) is under consideration. To alleviate propagation path loss of radio waves and increase propagation distances of radio waves in a millimeter wave band, technologies for 5G communication systems, such as beamforming, massive multi-input multi-output (MIMO), full dimensional MIMO (FD-MIMO), array antenna, analog beamforming, and large-scale antenna system are being discussed. Also, in order to improve a system network for 5G communication systems, technologies, such as evolved small cell, advanced small cell, cloud radio access network (cloud RAN), ultra-dense network, device-to-device (D2D) communication, wireless backhaul, moving network, cooperative communication, coordinated multi-points (CoMP), and reception interference cancellation, are being developed. In addition, for 5G communication systems, hybrid frequency shift keying (FSK) and quadrature amplitude modulation (QAM) (FQAM) and sliding window superposition coding (SWSC), which are advanced coding modulation (ACM) schemes, and filter bank multi-carrier (FBMC), non-orthogonal multiple access (NOMA), and sparse code multiple access (SCMA), which are advanced access technologies, have been developed.

The Internet has evolved from a human-centered connection network, through which humans generate and consume information, to an Internet of things (IoT) network that exchanges and processes information between distributed elements such as objects. An Internet of everything (IoE) technology is emerging, in which a technology related to the IoT is combined with, for example, a technology for processing big data through connection with a cloud server. In order to implement the IoT, various technical components are required, such as, a sensing technology, wired/wireless communication and network infrastructures, a service interfacing technology, a security technology, etc. In recent years, technologies including a sensor network for connecting objects, machine-to-machine (M2M) communication, machine type communication (MTC), etc., have been studied. In the IoT environment, intelligent Internet technology (IT) services may be provided to collect and interpret data obtained from objects connected to each other, and to create new value in human life. As existing information technology (IT) and various industries converge and combine with each other, the IoT may be applied to various fields, such as smart homes, smart buildings, smart cities, smart cars or connected cars, smart grids, health care, smart home appliances, high quality medical services, etc.

Various attempts are being made to apply 5G communication systems to IoT networks. For example, technologies related to sensor networks, M2M communication, MTC, etc., are implemented by using 5G communication technologies including beamforming, MIMO, array antenna, etc. The application of cloud RAN as the big data processing technology described above may be an example of convergence of 5G communication technology and IoT technology.

As it is possible to provide various services according to the development of mobile communication systems, there is a need for a method for a user equipment (UE) to access a non-public network for a specific service and an efficient method of transmitting Public Land Mobile Network (PLMN) information selected by a UE in a connected state.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a detailed operating method of a network and a user equipment (UE) for accessing a non-public network in a mobile communication system.

Another aspect of the disclosure is to provide a method and an apparatus capable of effectively providing a service in a mobile communication system.

Additional aspects will be set forth in part in the description which follows and, in part, will be apparent from the description, or may be learned by practice of the presented embodiments.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 1G is a diagram describing a procedure, performed by a UE in an RRC inactive mode (RRC_INACTIVE) or an RRC idle mode (RRC_IDLE), of establishing an RRC connection by accessing a stand-alone non-public network (SNPN) cell in an SNPN in a next-generation mobile communication system, according to an embodiment of the disclosure;

FIG. 1H is a diagram illustrating a UE operation, performed by a UE, of accessing an NPN cell according to an embodiment of the disclosure;

Throughout the drawings, like reference numerals will be understood to refer to like parts, components, and structures.

DETAILED DESCRIPTION

Figure 1A:
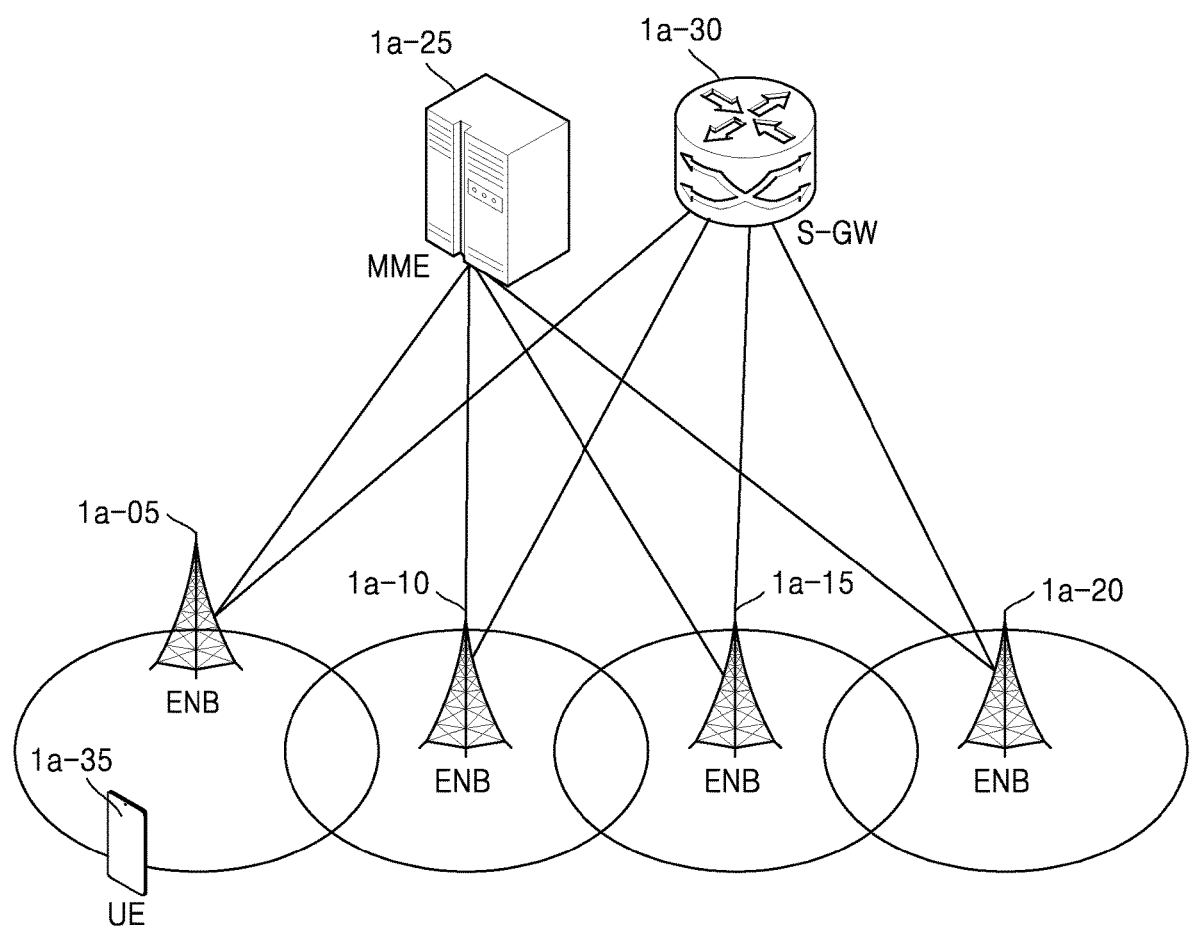
FIG. 1A is a diagram illustrating an architecture of a long term evolution (LTE) system, according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Throughout the disclosure, the expression "at least one of a, b or c" indicates only a, only b, only c, both a and b, both a and c, both b and c, all of a, b, and c, or variations thereof.

Examples of a terminal may include a user equipment (UE), a mobile station (MS), a cellular phone, a smartphone, a computer, a multimedia system capable of performing a communication function, and the like.

In the disclosure, a controller may also be referred to as a processor.

Throughout the specification, a layer (or a layer apparatus) may also be referred to as an entity.

It will be understood that the respective blocks of flowcharts and combinations of the flowcharts may be performed by computer program instructions. Because these computer program instructions may be embedded in a processor of a general-purpose computer, a special-purpose computer, or other programmable data processing apparatuses, the instructions executed through the processor of the computer or other programmable data processing apparatus generates modules for performing the functions described in the flowchart block(s). Because these computer program instructions may also be stored in a computer-executable or computer-readable memory that may direct the computer or other programmable data processing apparatus so as to implement functions in a particular manner, the instructions stored in the computer-executable or computer-readable memory are also capable of producing an article of manufacture containing instruction modules for performing the functions described in the flowchart block(s). Because the computer program instructions may also be embedded into the computer or other programmable data processing apparatus, the instructions for executing the computer or other programmable data processing apparatuses by generating a computer-implemented process by performing a series of operations on the computer or other programmable data processing apparatuses may provide operations for executing the functions described in the flowchart block(s).

Also, each block may represent part of a module, segment, or code that includes one or more executable instructions for executing a specified logical function(s). It should also be noted that, in some alternative implementations, the functions described in the blocks may occur out of the order noted in the drawings. For example, two blocks illustrated in succession may in fact be executed substantially concurrently, or the blocks may sometimes be executed in a reverse order, depending on the functions involved therein.

The term "module" or "-er/or" as used herein refers to a software element or a hardware element such as field programmable gate array (FPGA) or application specific integrated circuit (ASIC), and the "module" or "-er/or" performs certain functions. However, the term "module" or "-er/or" is not limited to software or hardware. The term "module" or "-er/or" may be configured in an addressable storage medium or may be configured to reproduce one or more processors. Therefore, for example, the term "module" includes elements, such as software elements, object-oriented software elements, class elements, and task elements, processes, functions, attributes, procedures, subroutines, segments of program code, drivers, firmware, microcode, circuits, data, databases, data structures, tables, arrays, and variables. Functions provided in the elements and the "modules" or "-ers/ors" may be combined with fewer elements and "modules" or "-ers/ors", or may be separated from additional elements and "modules" or "-ers/ors." Furthermore, the elements and the "modules" or "-ers/ors" may be implemented to reproduce one or more central processing units (CPUs) in the device or secure multimedia card. Also, in embodiments of the disclosure, the "module" or "-er/or" may include one or more processors.

In describing the disclosure, when the detailed description of the relevant known functions or configurations is determined to unnecessarily obscure the gist of the disclosure, the detailed description thereof may be omitted. Hereinafter, embodiments of the disclosure will be described in detail with reference to the accompanying drawings.

The term for identifying an access node, the term referring to network entities, the term referring to messages, the term referring to an interface between network entities, the terms referring to a variety of identification information, and the like are exemplified for convenience of description. Therefore, the disclosure is not limited to the terms to be described later, and other terms referring to entities having an equivalent technical meaning may be used.

For convenience of description, the terms and names defined in the 3$^{rd}$ Generation Partnership Project Long Term Evolution (3GPP LTE) standard are used herein. However, the disclosure is not limited by the terms and names and may be equally applied to systems conforming to other standards. The term "eNB" as used in the disclosure may be used interchangeably with the term "gNB" for convenience of description. That is, a base station described as the eNB may represent the gNB. Also, the term "terminal" may refer to not only mobile phones, NB-IoT devices, and sensors, but also other wireless communication devices.

Hereinafter, a base station assigns resources to a terminal, and may include at least one of a gNode B, an eNode B, a Node B, a BS, a radio access unit, a base station controller, or a node on a network. Examples of a terminal may include a user equipment (UE), a mobile station (MS), a cellular phone, a smartphone, a computer, a multimedia system capable of performing a communication function, and the like. Of course, the disclosure is not limited to the above examples.

In particular, the disclosure may be applied to 3GPP New Radio (NR) (5$^{th}$ generation (5G) mobile communication standard). Also, the disclosure may be applied to intelligent services (e.g., smart homes, smart buildings, smart cities, smart cars or connected cars, health care, digital education, retail, security and safety related services, etc.) based on 5G communication technologies and IoT related technologies. The term "eNB" as used herein may be used interchangeably with the term "gNB" for convenience of description. That is, a base station described as the eNB may represent the gNB. Also, the term "terminal" may refer to not only mobile phones, NB-IoT devices, and sensors, but also other wireless communication devices.

A wireless communication system has evolved from a system providing voice-oriented services to a broadband wireless communication system providing high speed high quality packet data services of communication standards such as High Speed Packet Access (HSPA) of 3GPP, LTE or Evolved Universal Terrestrial Radio Access (E-UTRA), LTE Advanced (LTE-A), LTE-Pro, High Rate Packet Data (HRPD) of 3GPP2, Ultra Mobile Broadband (UMB), and IEEE 802.16␣.

In an LTE system as a representative example of a broadband wireless communication system, an orthogonal frequency division multiplexing (OFDM) scheme is employed in a downlink (DL), and a single carrier frequency division multiple access (SC-FDMA) scheme is employed in an uplink (UL). The UL refers to a radio link through which a terminal (UE or MS) transmits data or a control signal to a base station (eNode B or BS), and the DL refers to a radio link through which a base station transmits data or a control signal to a terminal. In the multiple access scheme as described above, data or control information of each user may be distinguished by performing assignment and operation so that time-frequency resources for carrying data or control information for each user do not overlap each other, that is, orthogonality therebetween is established.

Future communication systems after LTE, that is, 5G communication systems have to be able to freely reflect various requirements of users and service providers. Therefore, services that satisfy various requirements at the same time have to be supported. Services considered for 5G communication systems include Enhanced Mobile Broadband (eMBB), Massive Machine Type Communication (MMTC), and Ultra Reliability Low Latency Communication (URLLC).

According to some embodiments of the disclosure, eMBB aims to provide a data rate that is higher than that supported by LTE, LTE-A, or LTE-Pro. For example, in 5G communication systems, eMBB has to be able to provide a peak data rate of 20 Gbps in a DL and a peak data rate of 10 Gbps in an UL in terms of a single base station. Also, the 5G communication systems have to provide a peak data rate and simultaneously provide an increased user perceived data rate of the terminal. In order to satisfy such requirements, there is a need to improve various transmission and reception technologies including a more advanced multi-input multi-output (MIMO) transmission technology in 5G communication systems. Also, in a 2 GHz band used by current LTE, signals are transmitted using up to 20 MHz transmission bandwidth. However, 5G communication systems use a frequency bandwidth wider than 20 MHz in 3 to 6 GHz frequency bands or 6 GHz or higher frequency bands. Therefore, the data rate required by 5G communication systems may be satisfied.

At the same time, mMTC is under consideration so as to support application services such as Internet of Thing (IoT) in 5G communication systems. In order to efficiently provide IoT, mMTC needs to support access of a massive terminal in a cell, improve coverage of the terminal, improve battery time, and reduce costs of the terminal. Because IoT is attached to various sensors and various devices to provide a communication function, IoT has to be able to support a large number of terminals (e.g., 1,000,000 terminals/km$^2$) in a cell. Also, due to the nature of the service, the terminal supporting mMTC is likely to be located in a shaded area that is not covered by the cell, such as the basement of a building. Therefore, wider coverage than other services provided by the 5G communication systems may be required. The terminal supporting mMTC has to be configured as an inexpensive terminal, and it is difficult to frequently replace a battery of the terminal. Therefore, a very long battery life time such as 10 to 15 years may be required.

Finally, URLLC is a cellular-based wireless communication service used for a specific purpose (mission-critical). URLLC may be used for services used in remote control for robots or machinery, industrial automation, unmanned aerial vehicles, remote health care, emergency alerts, and the like. Therefore, communication provided by URLLC has to provide very low latency and very high reliability. For example, a service supporting URLLC may have to satisfy air interface latency of less than 0.5 milliseconds and may simultaneously have a packet error rate of 10 or less. Therefore, for services supporting URLLC, the 5G systems may have to provide a smaller transmit time interval (TTI) than other services and may simultaneously be required for a design matter in which a resource of a wide region in a frequency band has to be allocated so as to ensure reliability of a communication link.

The above-described three services considered in 5G communication systems, that are, eMBB, URLLC, and mMTC, may be multiplexed and transmitted in a single system. In this case, different transmission and reception schemes and transmission and reception parameters may be used between the services so as to satisfy different requirements of the respective services. However, mMTC, URLLC, and eMBB are only examples of different service types, and the service types to which the disclosure is applied are not limited to the above-described examples.

Also, although LTE, LTE-A, LTE Pro, or 5G (or NR, next-generation mobile communication) systems will be described below as an example, embodiments of the disclosure may also be applicable to other communication systems having a similar technical background or channel form. Also, the disclosure may be applicable to other communication systems through some modifications without departing from the scope of the disclosure.

Hereinafter, an operation principle of the disclosure will be described in detail with reference to the accompanying drawings. In describing the disclosure, when the detailed description of the relevant known functions or configurations is determined to unnecessarily obscure the gist of the disclosure, the detailed description thereof may be omitted. The terms as used herein are those defined by taking into account functions in the disclosure, but the terms may vary depending on the intention of users or those of ordinary skill in the art, precedents, and the like. Therefore, the definitions should be made based on the contents throughout the specification. The term for identifying an access node, the term referring to network entities, the term referring to messages, the term referring to an interface between network entities, the terms referring to a variety of identification information, and the like are exemplified for convenience of description. Therefore, the disclosure is not limited to the terms to be described later, and other terms referring to entities having an equivalent technical meaning may be used.

The disclosure relates to a method and apparatus for transmitting non-public network-related information after radio resource control (RRC) connection in a non-public network system. To be more specific, the disclosure relates to a mobile communication system, and more particularly, to a method, performed by a base station, of segmenting and transmitting a DL RRC reconfiguration message, and an operation of a UE receiving the segmented DL RRC reconfiguration message.

An NR system basically supports services for normal UEs through a public network, but also supports access to a non-public network for specific services and services for the UEs. To this end, it is necessary to restrict the existing UEs from accessing the corresponding non-public network, and a UE procedure for accessing the non-public network is required. In the disclosure, a specific operation of a network and a UE for accessing a non-public network is proposed, and a method of transmitting Public Land Mobile Network (PLMN) information selected by a UE in a connected state is specified.

Through the specific procedure of the network and the UE for accessing the non-public network, which is proposed in the disclosure, each procedure for accessing a non-public network and a public network between a normal UE and a non-public network support UE may be identified and the procedure may be specified. Therefore, the UE may access the non-public network so that the specific service is supported, and the connection of the normal UE may be prevented.

FIG. 1A is a diagram illustrating an architecture of an LTE system, according to an embodiment of the disclosure.

Referring to FIG. 1A, a radio access network of an LTE system includes next-generation base stations (Evolved Node Bs, hereinafter eNBs, Node Bs, or BSs) 1a-05, 1a-10, 1a-15, and 1a-20, a mobility management entity (MME) 1a-25, and a serving-gateway (S-GW) 1a-30. A UE (or a terminal) 1a-35 accesses an external network through the eNBs 1a-05 to 1a-20 and the S-GW 1a-30.

In FIG. 1A, the eNBs 1a-05 to 1a-20 may correspond to an existing Node B of a Universal Mobile Telecommunication System (UMTS). The eNBs 1a-05 to 1a-20 may be connected to the UE 1a-35 through a radio channel and may perform a more complex role than the existing Node B. In the LTE system, all user traffics including real-time services such as Voice over IP (VoIP) through an Internet protocol may be serviced through a shared channel. Therefore, an apparatus for collecting and scheduling status information such as buffer status, available transmission power status, and channel status of UEs may be required. This may be handled by the eNBs 1a-05 to 1a-20. One eNB may typically control a plurality of cells. For example, in order to implement a transmission rate of 100 Mbps, the LTE system may use, for example, an OFDM scheme in a 20-MHz bandwidth as a radio access technology. Of course, the radio access technology that may be used by the LTE system is not limited to the above example. Also, the eNBs 1a-05 to 1a-20 may apply, to the LTE system, a modulation scheme and an adaptive modulation and coding (AMC) scheme, which determines a channel coding rate, according to the channel status of the UE. The S-GW 1a-30 is an entity that provides data bearers, and may add or release data bearers under the control by the MME 1a-25. The MME 1a-25 is an entity that is responsible for various control functions as well as mobility management functions for the UE and may be connected to a plurality of base stations.

Figure 1B:
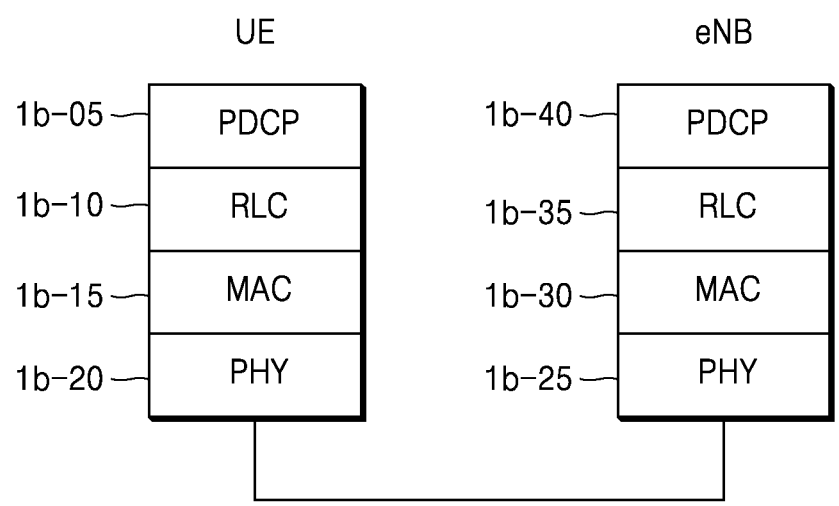
FIG. 1B is a diagram illustrating a radio protocol architecture of an LTE system, according to an embodiment of the disclosure.

FIG. 1B is a diagram illustrating a radio protocol architecture of an LTE system, according to an embodiment of the disclosure.

Referring to FIG. 1B, a radio protocol of a UE in the LTE system may include a packet data convergence protocol (PDCP) 1b-05, a radio link control (RLC) 1b-10, a medium access control (MAC) 1b-15, and a physical (PHY) layer 1b-20. Also, a radio protocol of an eNB in the LTE system may include a PDCP 1b-40, an RLC 1b-35, a MAC 1b-30, and a PHY layer 1b-25.

The PDCPs 1b-05 and 1b-40 may be responsible for operations such as IP header compression/decompression.

The main functions of the PDCP are summarized as follows. Of course, the disclosure is not limited to the following examples.

Header compression and decompression function (Header compression and decompression: Robust header compression (ROHC) only)
  User data transfer function (Transfer of user data)
  In-sequence delivery function (In-sequence delivery of upper layer PDUs at PDCP re-establishment procedure for RLC AM)
  Reordering function (For split bearers in DC (only support for RLC AM): PDCP PDU routing for transmission and PDCP PDU reordering for reception)

Duplicate detection function (Duplicate detection of lower layer SDUs at PDCP re-establishment procedure for RLC Acknowledged Mode (AM))

Retransmission function (Retransmission of PDCP SDUs at handover and, for split bearers in DC, of PDCP PDUs at PDCP data-recovery procedure, for RLC AM)

Ciphering and deciphering function (Ciphering and deciphering)

Timer-based SDU discard function (Timer-based SDU discard in uplink.)

The RLCs 1b-10 and 1b-35 may perform an automatic repeat request (ARQ) operation by reconfiguring a PDCP packet data unit (PDU) to an appropriate size. The main functions of the RLC are summarized as follows. Of course, the disclosure is not limited to the following examples.

Data transfer function (Transfer of upper layer PDUs)

ARQ function (Error Correction through ARQ (only for AM data transfer))

Concatenation, segmentation, and reassembly function (Concatenation, segmentation and reassembly of RLC SDUs (only for UM and AM data transfer))

Re-segmentation function (Re-segmentation of RLC data PDUs (only for AM data transfer))

Reordering function (Reordering of RLC data PDUs (only for UM and AM data transfer))

Duplicate detection function (Duplicate detection (only for UM and AM data transfer))

Error detection function (Protocol error detection (only for AM data transfer))

RLC SDU discard function (RLC SDU discard (only for UM and AM data transfer))

RLC re-establishment function (RLC re-establishment)

The MACs 1b-15 and 1b-30 may be connected to RLC layers configured in one UE. Also, the MACs 1b-15 and 1b-30 may perform an operation of multiplexing RLC PDUs into MAC PDUs and demultiplexing RLC PDUs from MAC PDUs. The main functions of the MAC are summarized as follows. Of course, the functions of the MAC are not limited to the following examples.

Mapping function (Mapping between logical channels and transport channels)

Multiplexing/demultiplexing function (Multiplexing/demultiplexing of MAC SDUs belonging to one or different logical channels into/from transport blocks (TB) delivered to/from the physical layer on transport channels)

Scheduling information reporting function (Scheduling information reporting)

HARQ function (Error correction through HARQ)

Function of handling priority between logical channels (Priority handling between logical channels of one UE)

Function of handling priority between UEs (Priority handling between UEs by means of dynamic scheduling)

MBMS service identifying function (MBMS service identification)

Transport format selecting function (Transport format selection)

Padding function (Padding)

The PHY layers 1b-20 and 1b-25 may perform an operation of channel-coding and modulating upper layer data, making the channel-coded and modulated upper layer data into OFDM symbols, and transmitting the OFDM symbols over a radio channel, or demodulating OFDM symbols received through a radio channel, channel-decoding the demodulated OFDM symbols, and transmitting the channel-decoded OFDM symbols to the upper layer. Also, hybrid ARQ (HARQ) may be used for additional error correction in the PHY layer, and a receiving end may transmit a reception or non-reception of a packet transmitted from a transmitting end in 1 bit. This is referred to as HARQ ACK/NACK information. DL HARQ ACK/NACK information for UL transmission may be transmitted through a physical channel such as a physical hybrid-ARQ indicator channel (PHICH), and UL HARQ ACK/NACK information for DL transmission may be transmitted through a physical channel such as a physical uplink control channel (PUCCH) or a physical uplink shared channel (PUSCH).

The PHY layers 1b-20 and 1b-25 may be configured to use one or more frequencies/carriers. A technology for simultaneously configuring and using a plurality of frequencies is referred to as carrier aggregation (CA). According to the use of the CA, a primary carrier and one or more subcarriers are additionally used for communication between the UE and the base station (E-UTRAN NodeB, eNB, etc.), such that the amount of transmission dramatically increases by the number of subcarriers. In the LTE, a cell in a base station using a primary carrier is referred to a primary cell (PCell), and a cell using a subcarrier is referred to as a secondary cell (SCell).

Although not illustrated, RRC layers may exist above the PDCP layers of the UE and the eNB, respectively, and the RRC layers may exchange access and measurement-related configuration control messages for radio resource control.

Figure 1C:
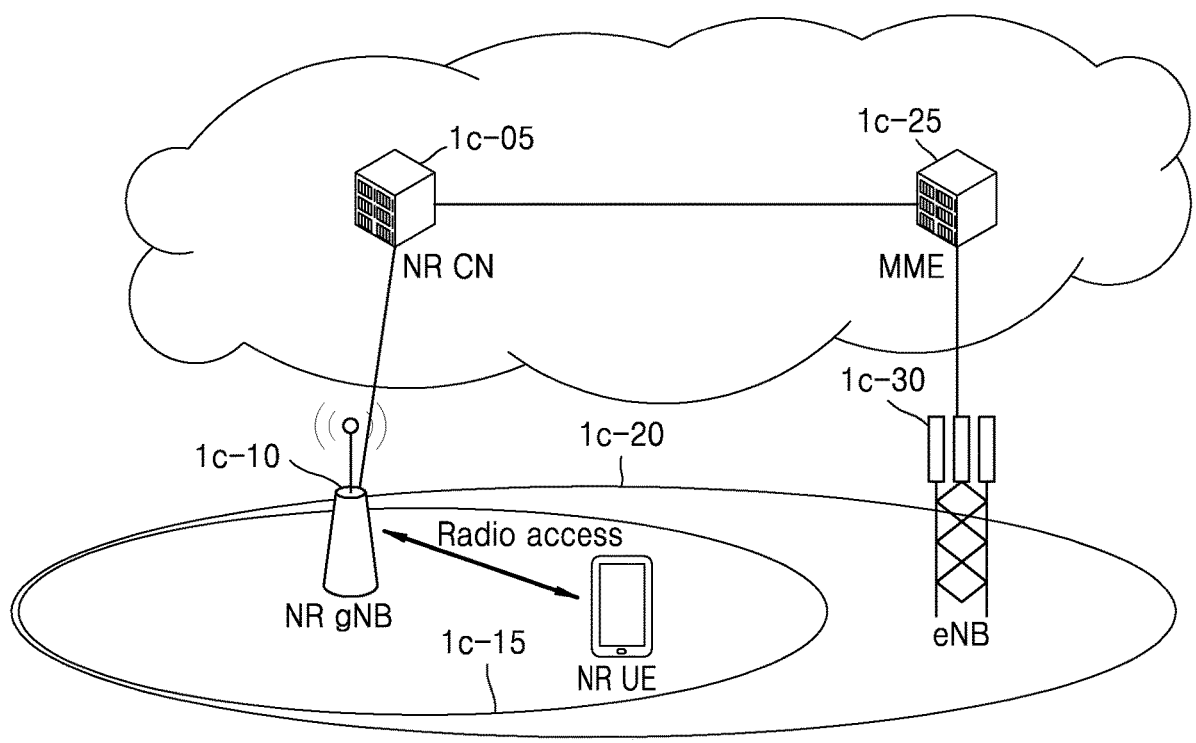
FIG. 1C is a diagram illustrating an architecture of a next-generation mobile communication system, according to an embodiment of the disclosure.

FIG. 1C is a diagram illustrating an architecture of a next-generation mobile communication system, according to an embodiment of the disclosure.

Referring to FIG. 1C, a radio access network of a next-generation mobile communication system may include a next-generation base station (New Radio Node B, hereinafter referred to as NR NB, NR gNB, gNB, or NR BS) 1c-10 and a New Radio core network (NR CN) (or next-generation core network (NG CN)) 1c-05. A New Radio user equipment (NR UE) (or a UE) 1c-15 may access an external network through the NR gNB 1c-10 and the NR CN 1c-05.

In FIG. 1C, the NR gNB 1c-10 corresponds to an eNB of an existing LTE system. The NR gNB 1c-10 may be connected to the NR UE 1c-15 through a radio channel and may provide a service superior to that of the existing Node B. In the next-generation mobile communication system, all user traffics may be serviced through a shared channel. Therefore, an apparatus for collecting and scheduling status information such as buffer status, available transmission power status, and channel status of UEs may be required. This may be handled by the NR gNB 1c-10 One NR gNB 1c-10 may typically control a plurality of cells.

According to an embodiment of the disclosure, the next-generation mobile communication system may have more than the existing maximum bandwidth so as to implement ultra-high-speed data transmission compared to the existing LTE, and may additionally use a beamforming technology by using OFDM as a radio access technology. Also, the NR gNB 1c-10 may apply a modulation scheme and an AMC scheme, which determines a channel coding rate, according to the channel status of the UE.

The NR CN 1c-05 may perform functions such as mobility support, bearer configuration, and quality of service (QoS) configuration. The NR CN 1c-05 is an entity that is responsible for various control functions as well as a mobility management function for the UE, and may be connected to a plurality of base stations.

Also, the next-generation mobile communication system may interoperate with the existing LTE system, and the NR CN 1c-05 may be connected to the MME 1c-25 through a network interface. The MME 1c-25 may be connected to the eNB 1c-30, which is the existing base station.

Figure 1D:
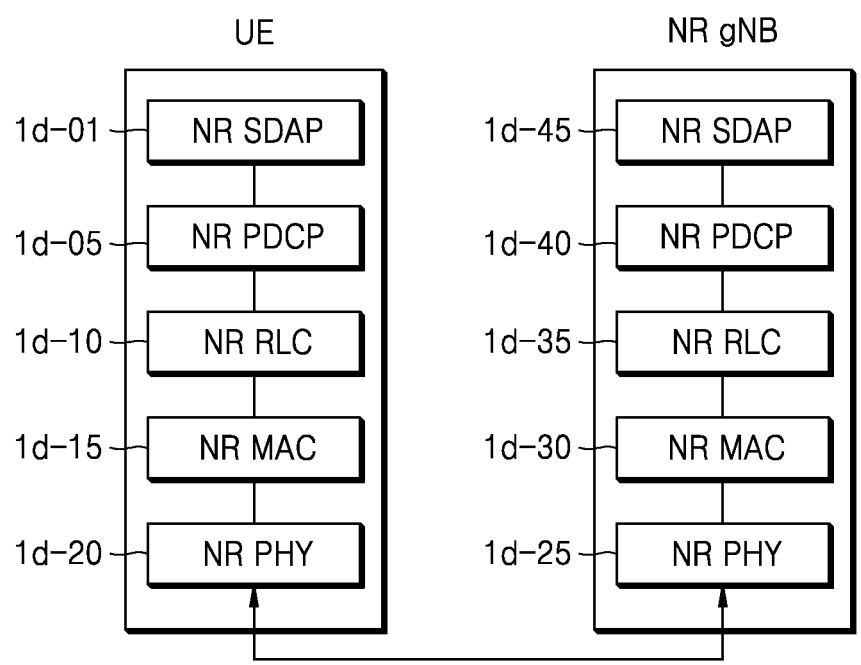
FIG. 1D is a diagram illustrating a radio protocol architecture of a next-generation mobile communication system, according to an embodiment of the disclosure.

FIG. 1D is a diagram illustrating a radio protocol architecture of a next-generation mobile communication system, according to an embodiment of the disclosure.

Referring to FIG. 1D, a radio protocol of a UE in the next-generation mobile communication system may include an NR service data adaptation protocol (SDAP) 1d-01, an NR PDCP 1d-05, an NR RLC 1d-10, an NR MAC 1d-15, and an NR PHY layer 1d-20. Referring to FIG. 1D, a radio protocol of an NR gNB in the next-generation mobile communication system may include an NR SDAP 1d-45, an NR PDCP 1d-40, an NR RLC 1d-35, an NR MAC 1d-30, and an NR PHY layer 1d-25.

The main functions of the NR SDAPs 1d-01 and 1d-45 may include some of the following functions. Obviously, the disclosure is not limited to the following examples.

- User data transfer function (transfer of user plane data)
- Function of mapping between QoS flow and data bearer for UL and DL (mapping between a QoS flow and a data radio bearer (DRB) for both DL and UL)
- Function of marking QoS flow ID in UL and DL (marking QoS flow ID in both DL and UL packets)
- Function of mapping reflective QoS flow to data bearer for UL SDAP PDUs (reflective QoS flow to DRB mapping for the UL SDAP PDUs)

In regard to the NR SDAP layers 1d-01 and 1d-45, the UE may receive an RRC message to configure whether to use the header of the SDAP layer or whether to use the function of the SDAP layer for each PDCP layer, for each bearer, or for each logical channel. Also, when the SDAP header is configured, a 1-bit non-access stratum (NAS) reflective QoS indicator and a 1-bit access stratum (AS) reflective QoS indicator of the SDAP header may indicate the UE to update or reconfigure mapping information between a QoS flow and a data bearer for UL and DL. According to an embodiment of the disclosure, the SDAP header may include QoS flow ID information indicating QoS. Also, according to an embodiment of the disclosure, QoS information may be used as data processing priority, scheduling information, etc., for supporting efficient services.

According to an embodiment of the disclosure, the main functions of the NR PDCPs 1d-05 and 1d-40 may include some of the following functions. Of course, the disclosure is not limited to the following examples.

- Header compression and decompression function (Header compression and decompression: ROHC only)
- User data transfer function (Transfer of user data)
- In-sequence delivery function (In-sequence delivery of upper layer PDUs)
- Out-of-sequence delivery function (Out-of-sequence delivery of upper layer PDUs)
- Reordering function (PDCP PDU reordering for reception)
- Duplicate detection function (Duplicate detection of lower layer SDUs)
- Retransmission function (Retransmission of PDCP SDUs)
- Ciphering and deciphering function (Ciphering and deciphering)
- Timer-based SDU discard function (Timer-based SDU discard in uplink.)

The reordering function of the NR PDCP layers 1d-05 and 1d-40 may refer to a function of reordering PDCP PDUs received from the lower layer in sequence based on a PDCP sequence number (SN). The reordering function of the NR PDCP layers 1d-05 and 1d-40 may include at least one of a function of transmitting data to the upper layer in reordered order, a function of immediately transmitting data without considering the order, a function of reordering PDCP PDUs and recording lost PDCP PDUs, a function of reporting the status of the lost PDCP PDUs to a sender, or a function of requesting retransmission of the lost PDCP PDUs.

According to an embodiment of the disclosure, the main functions of the NR RLCs 1d-10 and 1d-35 may include some of the following functions. Of course, the disclosure is not limited to the following examples.

- Data transfer function (Transfer of upper layer PDUs)
- In-sequence delivery function (In-sequence delivery of upper layer PDUs)
- Out-of-sequence delivery function (Out-of-sequence delivery of upper layer PDUs)
- ARQ function (Error correction through ARQ)
- Concatenation, segmentation, and reassembly function (Concatenation, segmentation and reassembly of RLC SDUs)
- Re-segmentation function (Re-segmentation of RLC data PDUs)
- Reordering function (Reordering of RLC data PDUs)
- Duplicate detection function (Duplicate detection)
- Error detection function (Protocol error detection)
- RLC SDU discard function (RLC SDU discard)
- RLC re-establishment function (RLC re-establishment)

The in-sequence delivery function of the NR RLC layers 1d-10 and 1d-35 may refer to a function of transmitting RLC SDUs received from the lower layer to the upper layer in sequence. The in-sequence delivery function of the NR RLC layer may include at least one of a function of, when one RLC SDU is received after being segmented into a plurality of RLC SDUs, reassembling and transmitting the segmented and received RLC SDUs, a function of reordering the received RLC PDUs based on an RLC SN or a PDCP SN, a function of reordering the RLC PDUs and recording the lost RLC PDUs, a function of reporting the status of the lost RLC PDUs to the sender, a function of requesting retransmission of the lost RLC PDUs, a function of, when there is the lost RLC SDU, transmitting only RLC SDUs up to before the lost RLC SDU to the upper layer in sequence, a function of, when there is the lost RLC SDU but a certain timer has expired, transmitting all RLC SDUs received before the start of the timer to the upper layer in sequence, or a function of, when there is the lost RLC SDU and a certain timer has expired, transmitting all RLC SDUs received so far to the upper layer in sequence.

Also, the NR RLC layer may process RLC PDUs in the order of reception (in the order of arrival regardless of the order of serial number and sequence number) and transmit the processed RLC PDUs to the PDCP layer regardless of the order (out-of-sequence delivery). When the received RLC PDUs are segments, segments stored in a buffer or to be received in the future may be received, reconfigured into one complete RLC PDU, and processed and transmitted to the PDCP layer. The NR RLC layer may not include the concatenation function, and the concatenation function may be performed by the NR MAC layer, or may be replaced with the multiplexing function of the NR MAC layer.

According to an embodiment of the disclosure, the out-of-sequence delivery function of the NR RLC layer may refer to a function of transmitting RLC SDUs received from the lower layer directly to the upper layer regardless of the order, and may include at least one of a function of, when one RLC SDU is received after being segmented into a plurality of RLC SDUs, reassembling and transmitting the segmented and received RLC SDUs, or a function of storing the RLC SN or PDCP SN of the received RLC PDUs, reordering the RLC PDUs, and recording the lost RLC PDUs.

According to an embodiment of the disclosure, the NR MACs 1d-15 and 1d-30 may be connected to a plurality of NR RLC layers configured in one UE, and the main functions of the NR MACs 1d-15 and 1d-30 may include some of the following functions. Of course, the disclosure is not limited to the following examples.

Mapping function (Mapping between logical channels and transport channels)

Multiplexing and demultiplexing function (Multiplexing/demultiplexing of MAC SDUs)

Scheduling information reporting function (Scheduling information reporting)

HARQ function (Error correction through HARQ)

Function of handling priority between logical channels (Priority handling between logical channels of one UE)

Function of handling priority between UEs (Priority handling between UEs by means of dynamic scheduling)

MBMS service identifying function (MBMS service identification)

Transport format selecting function (Transport format selection)

Padding function (Padding)

According to an embodiment of the disclosure, the NR PHY layers 1d-20 and 1d-25 may channel-code and modulate upper layer data, make the channel-coded and modulated upper layer data into OFDM symbols, and transmit the OFDM symbols over a radio channel. Also, the NR PHY layers 1d-20 and 1d-25 may demodulate OFDM symbols received through a radio channel, channel-decode the demodulated OFDM symbols, and transmit the channel-decoded OFDM symbols to the upper layer. The operation of the NR PHY layers 1d-20 and 1d-25 is not limited to the above examples.

Figure 1E:
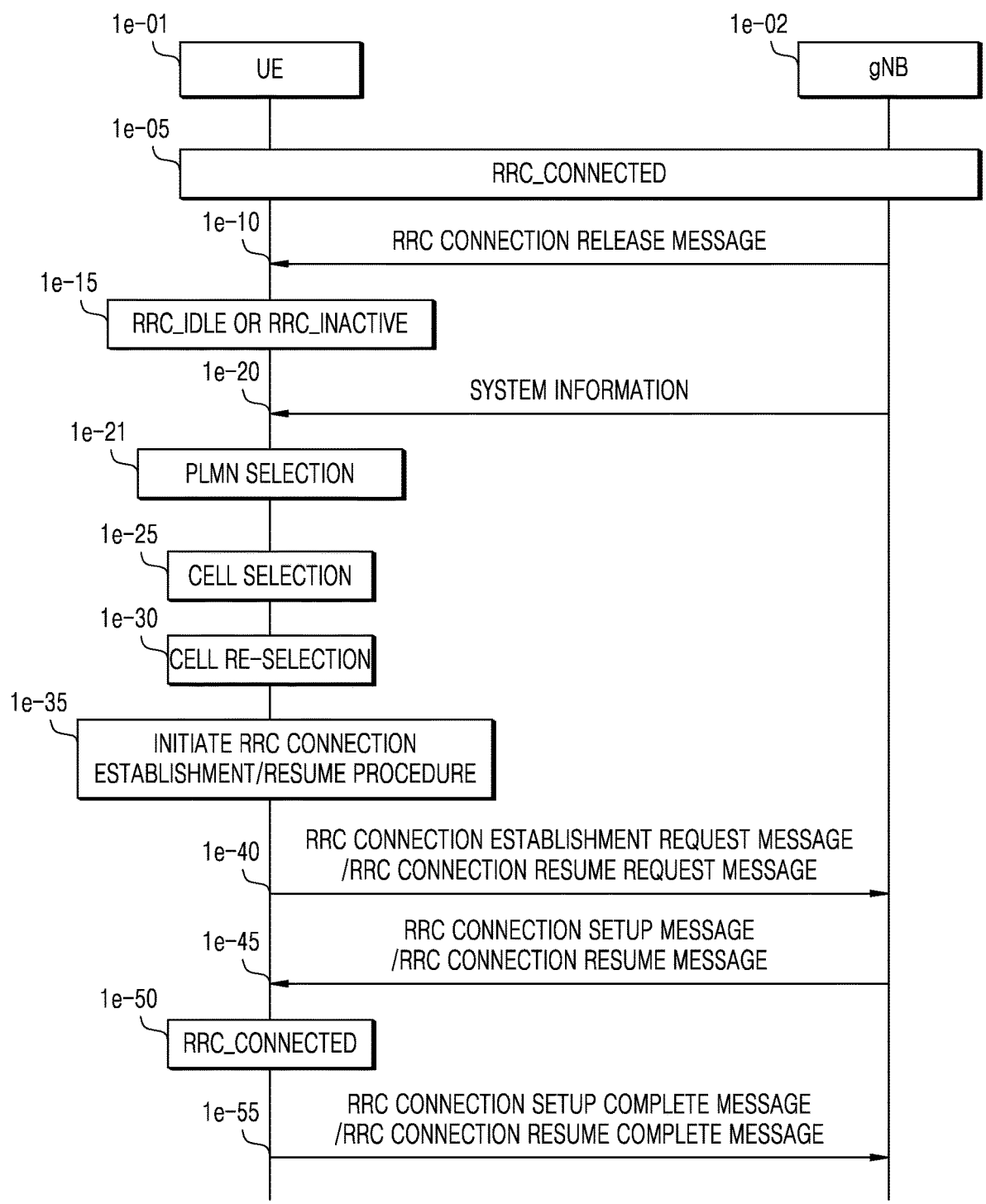
FIG. 1E is a diagram describing a procedure, performed by a user equipment (UE) in a radio resource control (RRC) inactive mode (RRC_INACTIVE) or an RRC idle mode (RRC_IDLE), of establishing an RRC connection with a base station through regular access in a next-generation mobile communication system, according to an embodiment of the disclosure.

FIG. 1E is a diagram describing a procedure, performed by a UE in an RRC inactive mode (RRC_INACTIVE) or an RRC idle mode (RRC_IDLE), of establishing an RRC connection with a base station through regular access in a next-generation mobile communication system, according to an embodiment of the disclosure.

Regular access according to an embodiment of the disclosure may mean that a UE 1e-01 establishes an RRC connection with a gNB 1e-02 through a public network to receive a normal service (for public use on a suitable cell). Specifically, the UE 1e-01 may determine that regular access to a suitable cell is possible when the following conditions for accessing the suitable cell are satisfied.

Condition 1: A case in which the cell is part of PLMN belonging to the selected PLMN, the registered PLMN, or PLMN of the equivalent PLMN list (The cell is part of either the selected PLMN or the registered PLMN or PLMN of the Equivalent PLMN list).

Condition 2: A case in which the cell satisfies the cell selection criteria.

The cell selection criteria may mean Equation 1 below.

$$\text{Srxlev} > 0 \text{ AND Squal} > 0 \qquad \text{Equation 1}$$

where:

$$\text{Srxlev} = \text{Qrxlevmeas} - (\text{Qrxlevmin} + \text{Qrxlevminoffset}) - \text{Pcompensation} - \text{Qoffsettemp}$$

$$\text{Squal} = \text{Qqualmeas} - (\text{Qqualmin} + \text{Qqualminoffset}) - \text{Qoffsettemp}$$

For the definitions of parameters used in Equation 1, refer to 3GPP standard document "38.304: User Equipment (UE) procedures in idle mode." The parameters may be included in system information (e.g., SIB1 or SIB2) broadcast by the cell. Hereinafter, the definitions of the above-described parameters may be equally applied to embodiments of the disclosure to which Equation 1 is applied.

Condition 3: A case in which the cell is not barred according to information that is most recently provided from the NAS layer, and the cell is part of at least one tracking area (TA) that is not part of the list of "forbidden tracking areas" which belongs to a PLMN that satisfies Condition 1 (The cell is part of at least one TA that is not part of the list of "forbidden Tracking Areas" which belongs to a PLMN that fulfils the first bullet above).

According to an embodiment of the disclosure, the case in which the cell is barred may refer to at least one of a case in which a 'cellBarred' indicator is set to "barred" in a master information block (MIB), a case in which a "cellReservedForOperatorUse" indicator is set to "reserved" in SIB1, or a case in which a "cellReservedForOtherUse" indicator is set to "true." However, the case in which the cell is barred is not limited to the above-described examples.

Referring to FIG. 1E, the UE 1e-01 may be in an RRC connected mode (RRC_CONNECTED) by establishing an RRC connection with the gNB 1e-02 (1e-05).

When there is no data transmission or reception for a certain reason or for a certain time, the gNB 1e-02 may transmit an RRC connection release message (RRCRelease) to the UE 1e-01 (1e-10).

In this case, when suspend configuration information (suspendConfig) is included in the RRC connection release message, the UE 1e-01 may transition to an RRC inactive mode, and when the suspend configuration information is not included in the RRC connection release message, the UE 1e-01 may transition to an RRC idle mode (1e-15). The UE 1e-01 that has transitioned to the RRC idle mode or the RRC inactive mode may select a PLMN (1e-21).

According to an embodiment of the disclosure, in the UE 1e-01, the AS layer may report one or more available PLMNs to a NAS layer on request from the NAS layer or automatically (In the UE, the AS shall report available PLMNs to the NAS on request from the NAS or automatically).

During a PLMN selection process, based on the list of PLMN identities in priority order, the particular PLMN may be selected either automatically or manually (During PLMN selection, based on the list of PLMN identities in priority order, the particular PLMN may be selected either automatically or manually). Each PLMN in the list of PLMN identifies may be identified by a 'PLMN identity.' (Each PLMN in the list of PLMN identities is identified by a 'PLMN identity').

The UE 1e-01 may include one or more PLMN identities for a given cell in the system information SIB1 signaled through a broadcast channel. In the system information on the broadcast channel, the UE 1e-01 may receive one or more multiple 'PLMN identity' in a given cell (In the system information on the broadcast channel, the UE can receive one or more multiple 'PLMN identity' in a given cell).

The result of the PLMN selection procedure performed by the NAS layer is an identifier of the selected PLMN (The result of the PLMN selection performed by NAS is an identifier of the selected PLMN). The NAS layer may provide an equivalent PLMN list to the AS layer through the PLMN selection procedure 1e-21. The equivalent PLMN list refers to the list of PLMNs selected by the UE for cell selection, cell reselection, and handover and PLMNs considered as equivalent (List of PLMNs considered as equivalent by the UE for cell selection, cell reselection, and handover according to the information provided by NAS).

The NAS layer may provide the equivalent PLMN list to the AS layer through the PLMN selection procedure. The equivalent PLMN list refers to the list of PLMNs selected by the UE for cell selection, cell reselection, and handover and PLMNs considered as equivalent (List of PLMNs considered as equivalent by the UE for cell selection, cell reselection, and handover according to the information provided by NAS).

The PLMN selection procedure 1e-21 may be performed before operation 1e-20. For example, when the UE 1e-01 that has transitioned to the RRC connected mode in operation 1e-05 performs a location registration procedure, the UE 1e-01 may maintain a registered PLMN. Alternatively, the UE 1e-01 may maintain the list of selected PLMNs and equivalent PLMNs by selecting the PLMN before transitioning to the RRC connected mode (before operation 1e-05).

When the PLMN is selected, the UE 1e-01 may receive or obtain system information (1e-20) and perform a cell selection process (1e-25). That is, the UE 1e-01 may receive (or obtain) at least one MIB and SIB1 and perform the cell selection process to camp on to a suitable cell for the corresponding PLMN. The corresponding PLMN may refer to a PLMN corresponding to Condition 1. Specifically, the PLMN corresponding to Condition 1 may be determined through a CellAccessRelatedInfo information element broadcast in SIB1.

The CellAccessRelatedInfo information element may include a plmn-IdentityList information element. The plmn-IdentityList information element may be configured in the following form.

plmn-IdentityList may include plmn-IdentityInfoList.

plmn-IdentityInfoList may include one or more pieces of PLMN-IdentityInfo.

Each PLMN-IdentityInfo may include plmn-IdentityList including one logical cellIdentity and one or more PLMN-Identities mapped thereto.

The PLMN identifier included in the plmn-IdentityList information element may be configured as described below.

--- plmn-IdentityList
The plmn-IdentityList is used to configure a set of PLMN-IdentityInfoList elements. Each of those elements contains a list of one or more PLMN Identities and additional information associated with those PLMNs. The total number of PLMNs in the PLMN-IdentityInfoList does not exceed 12. The PLMN index is defined as $b1 + b2 + \ldots + b(n-1) + i$ for the PLMN included at the n-th entry of and PLMN-IdentityInfoList and the i-th entry of its corresponding PLMN-IdentityInfo, where b(j) is the number of PLMN-Identity entries in each PLMN-IdentityInfo, respectively.

---

For example, referring to Table 1, PLMN-IdentityInfoList may include PLMN-IdentityInfo 1 and PLMN-IdentityInfo 2. In this case, for example, PLMN-IdentityInfo 1 and PLMN-IdentityInfo 2 may each include two PLMN-Identities. At this time, a PLMN index of the first PLMN-Identity included in PLMN-Identityinfo 1 may be "1" and a PLMN index of the second PLMN-Identity included in PLMN-IdentityInfo 1 may be "2." A PLMN index of the first PLMN-Identity included in PLMN-IdentityInfo 2 may be "3" and a PLMN index of the second PLMN-Identity included in PLMN-IdentityInfo 2 may be "4."

TABLE 1

| PLMN-IdentityInfoList | PLMN-IdentityInfo 1 | 2 PLMN-Identities |
|---|---|---|
|  | PLMN-IdentityInfo 2 | 2 PLMN-Identities |

CellAccessRelatedInfo
The IE CellAccessRelatedInfo indicates cell access related information for this cell.
CellAccessRelatedInfo information element

```
-- ASN1START
-- TAG-CELLACCESSRELATEDINFO-START
CellAccessRelatedInfo  ::=        SEQUENCE {
    plmn-IdentityList             PLMN-IdentityInfoList,
    cellReservedForOtherUse       ENUMERATED {true}   OPTIONAL,
        -- Need R
    ...
}
-- TAG-CELLACCESSRELATEDINFO-STOP
-- ASN1STOP
```

PLMN-IdentityInfoList
The IE PLMN-IdentityInfoList includes a list of PLMN identity information.
PLMN-IdentityInfoList information element

```
-- ASN1START
-- TAG-PLMN-IDENTITYINFOLIST-START
PLMN-IdentityInfoList ::=         SEQUENCE (SIZE (1..maxPLMN)) OF
PLMN-IdentityInfo
PLMN-IdentityInfo ::=             SEQUENCE {
    plmn-IdentityList                 SEQUENCE (SIZE (1..maxPLMN))
OF PLMN-Identity,
    trackingAreaCode                  TrackingAreaCode
        OPTIONAL,                         -- Need R
    ranac                             RAN-AreaCode
```

TABLE 1-continued

```
        OPTIONAL,              -- Need R
   cellIdentity                CellIdentity,
     cellReservedForOperatorUse   ENUMERATED (reserved, notRese
rved},
    ...
}
-- TAG-PLMN-IDENTITYINFOLIST-STOP
-- ASN1STOP
```

The UE 1e-01 that has camped on the suitable cell may perform a cell re-selection process (1e-30). That is, the UE 1e-01 may re-select a cell based on SIB2, SIB3, SIB4, SIB5, SIB6, and the like including a cell re-selection parameter.

In operation 1e-35, the UE 1e-01 may initiate an RRC connection for a certain reason or in order to transmit and receive data to and from the gNB 1e-02. Specifically, in operation 1e-35, when the UE 1e-01 is in the RRC idle mode, the UE 1e-01 may perform an RRC connection establishment procedure with the gNB 1e-02.

The UE 1e-01 in the RRC idle mode may establish reverse synchronization with the gNB 1e-02 and transmit an RRC connection establishment request message (RRCSetupRequest message) to the gNB 1e-02 (1e-40). The RRC connection establishment request message may include a UE identifier (ue-Identity) and an RRC connection establishment cause (establishmentCause).

When the gNB 1e-02 successfully receives the RRC connection establishment request message, the gNB 1e-02 may transmit an RRC connection setup message (RRCSetup message) to the UE 1e-01 (1e-45). The RRC connection setup message may include radio resource configuration information (radioBearerConfig) and master cell group configuration information (masterCellGroup).

When the UE 1e-01 successfully receives the RRC connection setup message, the UE 1e-01 may apply configuration information included in the RRC connection setup message and transition to the RRC connected mode (1e-50). The UE 1e-01 may regard a current cell as a primary cell (hereinafter, referred to as a PCell).

The UE 1e-01 may regard a current cell as a primary cell (hereinafter, referred to as a PCell). The UE 1e-01 that has transitioned to the RRC connected mode may transmit an RRC connection setup complete message (RRCSetupComplete message) to the gNB 1e-02 by including the following content in the RRC connection setup complete message (1e-55).

One PLMN from among one or more PLMNs included in plmn-IdentityList broadcast in SIB1 may be set to a PLMN (selectedPLMN-Identity) selected by the upper layers (set the selectedPLMN-Identity to the PLMN selected by upper layers from the PLMN(s) included in the plmn-IdentityList in SIB1). For example, as described above, selectedPLMN-Identity may refer to the first PLMN-Identity in plmn-IdentityList mapped to cellIdentity in the first PLMN-IdentityInfo in PLMN-IdentityInfoList.

In operation 1c-35, when the UE 1e-01 is in the RRC inactive mode, the UE. 1e-01 may perform an RRC connection resume procedure with the gNB 1e-02. The UE 1e-01 in the RRC inactive mode may establish reverse synchronization with the gNB 1e-02 and transmit an RRC connection resume request message (RRCResumeRequest or RRCResumeRequest1 message) to the gNB 1e-02 (1e-40). The RRC connection resume request message may include an identifier (resumeIdentity) of the UE 1e-01, a resume message authentication code for integrity (hereinafter, referred to as resumeMAC-I), a resume cause (resumeCause), and the like.

When the gNB 1e-02 successfully receives the RRC connection resume request message, the gNB 1e-02 may transmit an RRC connection resume message (RRCResume message) to the UE 1e-01 (1e-45). The RRC connection resume message may include at least one of radio resource configuration information (radioBearerConfig), master cell group configuration information (masterCellGroup), measurement configuration information (measConfig), an indicator (fullConfig) indicating full configuration, second radio resource configuration information (radioBearerConfig2), or a sk-Counter value.

When the UE 1e-01 successfully receives the RRC connection resume message, the UE 1e-01 may apply configuration information included in the RRC connection resume message and transition to the RRC connected mode (1e-50). The UE 1e-01 may regard a current cell as a PCell.

Figure 1F:
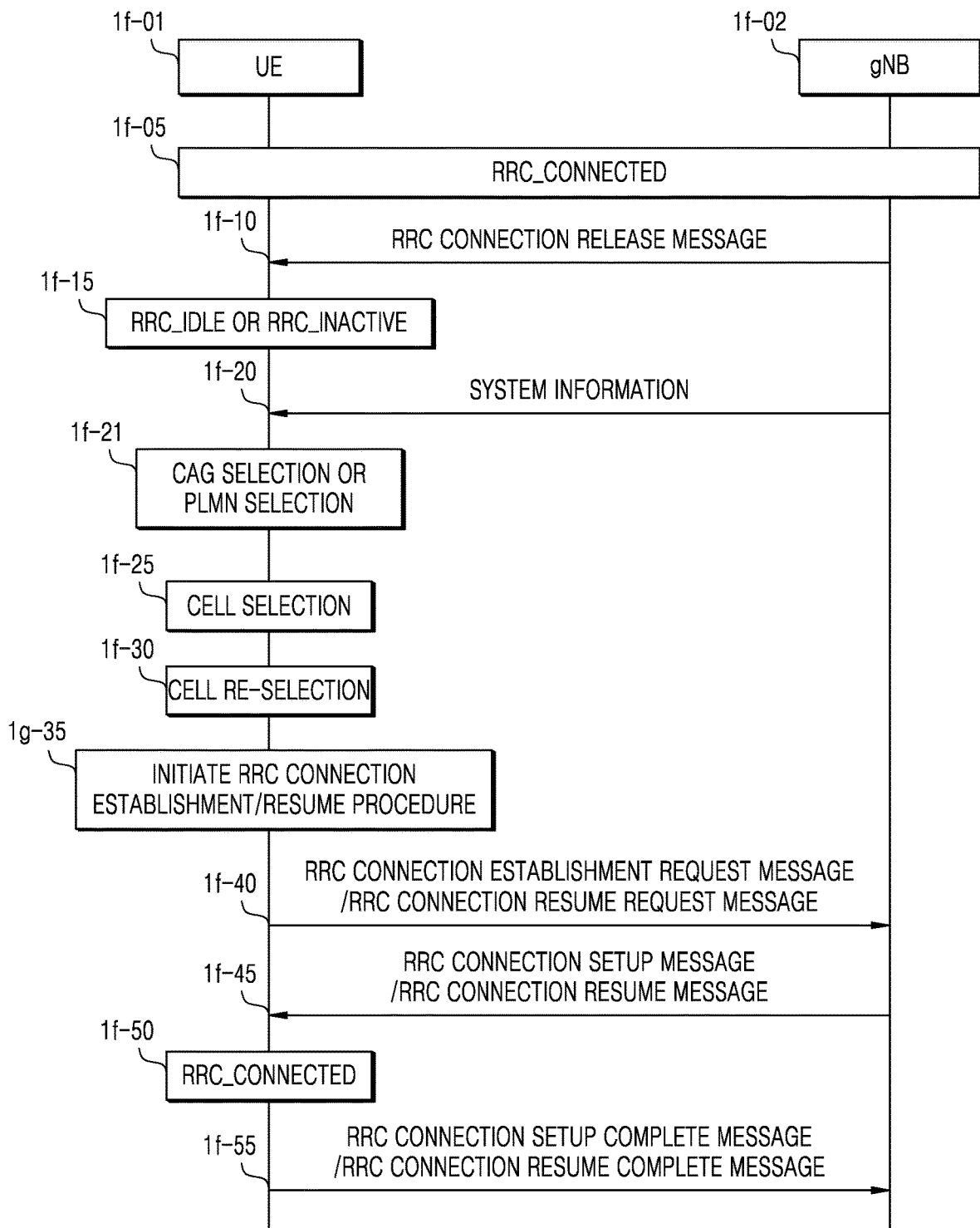
FIG. 1F is a diagram describing a procedure, performed by a UE in an RRC inactive mode (RRC_INACTIVE) or an RRC idle mode (RRC_IDLE), of establishing an RRC connection by accessing a closed access group (CAG) cell in a public network integrated non-public network (PNI-NPN) in a next-generation mobile communication system, according to an embodiment of the disclosure.

The UE 1e-01 that has transitioned to the RRC connected mode may transmit an RRC connection resume complete message (RRCResumeComplete message) to the gNB 1e-02 (1e-55). In the RRC connection resume complete message, when the PLMN is provided by the upper layer, selectedPLMN-Identity may be set to a PLMN selected by the upper layers from among one or more PLMNs included in plmn-IdentityList broadcast in SIB1 (set the selectedPLMN-Identity to the PLMN selected by upper layers from the PLMN(s) included in the plmn-IdentityList in SIB1). As described above, the UE 1e-01 according to an embodiment of the disclosure does not include the selected PLMN-Identity value itself in the RRC connection resume complete message, and includes the index value of the selected PLMN in the RRC connection resume complete message FIG. 1F is a diagram describing a procedure, performed by a UE in an RRC inactive mode (RRC_INACTIVE) or an RRC idle mode (RRC_IDLE), of establishing an RRC connection by accessing a closed access group (CAG) cell in a public network integrated non-public network (PNI-NPN) in a next-generation mobile communication system, according to an embodiment of the disclosure.

A PNI-NPN according to an embodiment of the disclosure may refer to a non-public network (referred to as an NPN) deployed through a PLMN (PNI-NPNs are NPNs made available via PLMNs). Therefore, in the case of the NPN formed through the PLMN, the UE has to have a subscription in the corresponding PLMN (when an NPN is made available via a PLMN, then the UE has a subscription for the PLMN).

Specifically, the CAG may identify a group of subscribers who are permitted to access one or more CAG cells associated with the CAG (A CAG identifies a group of subscribers who are permitted to access one or more CAG cells associated to the CAG). In other words, the CAG may prevent the UE, which does not have access rights to CAG cells, from accessing PNI-NPN (CAG is used for PNI-NPNs to prevent UE(s), which are not allowed to access the NPN via the associated cell(s), from automatically selecting and accessing the associated cell(s). SNPN (Stand-alone Non-Public Network)

A UE that is not in an access mode may regard a certain cell as a suitable cell when the following conditions are satisfied.

Condition 1-1: A case in which the cell is part of either the selected PLMN or the registered PLMN or PLMN of the equivalent PLMN list, and a CAG-ID broadcast by the cell for the corresponding PLMN is included in a UE's allowed CAG list (e.g., a list of CAG identifiers that the UE is allowed to access (The cell is part of either the selected PLMN or the registered PLMN or PLMN of the Equivalent PLMN list, and for that PLMN allowed CAG list in the UE for that PLMN includes a CAG-ID broadcast by the cell for that PLMN).

Condition 1-2: A case in which the cell is part of either the selected PLMN or the registered PLMN or PLMN of the equivalent PLMN list, CAG-only indication is not broadcast or is false, and CAG-ID(s) is not broadcast (The cell is part of either the selected PLMN or the registered PLMN or PLMN of the Equivalent PLMN list of the UE for which the PLMN-ID is broadcast by the cell with no associated CAG-IDs and for which CAG-only indication is absent or false).

Condition 2: A case in which the cell satisfies the cell selection criteria.

The cell selection criteria may mean Equation 1 below.

$$Srxlev>0 \text{ AND } Squal>0 \quad \text{Equation 1}$$

where:

$$Srxlev=Qrxlevmeas-(Qrxlevmin+Qrxlevminoffset)-Pcompensation-Qoffsettemp$$

$$Squal=Qqualmeas-(Qqualmin+Qqualminoffset)-Qoffsettemp$$

For the definitions of parameters used in Equation 1, refer to 3GPP standard document "38.304: User Equipment (UE) procedures in idle mode." The parameters may be included in system information (e.g., SIB1 or SIB2) broadcast by the cell. Hereinafter, the definitions of the above-described parameters may be equally applied to embodiments of the disclosure to which Equation 1 is applied.

Condition 3: A case in which the cell is not barred according to information that is most recently provided from the NAS layer, and the cell is part of at least one tracking area (TA) that is not part of the list of "forbidden tracking areas" which belongs to a PLMN that satisfies Conditions 1-1 and/or Condition 1-2 (The cell is part of at least one TA that is not part of the list of "Tracking Areas").

According to an embodiment of the disclosure, the case in which the cell is barred may refer to at least one of a case in which a 'cellBarred' indicator is set to "barred" in a MIB, a case in which a "cellReservedForOperatorUse" indicator is set to "reserved" in SIB1, a case in which a Rel-16 "cellReservedForOperatorUse" indicator is set to "reserved", a case in which a Re-15 "cellReservedForOperatorUse" indicator is set to "true", or a case in which CAG-ID(s) is not transmitted in a corresponding cell. However, the case in which the cell is barred is not limited to the above-described examples.

Referring to FIG. 1F, a UE 1f-01 may be in an RRC connected mode (RRC_CONNECTED) by establishing an RRC connection with a gNB 1e-02 (1f-05).

When there is no data transmission or reception for a certain reason or for a certain time, the gNB 1f-02 may transmit an RRC connection release message (RRCRelease) to the UE 1f-01 (1f-10). When suspend configuration information (suspendConfig) is included in the RRC connection release message, the UE 1f-01 may transition to an RRC inactive mode, and when the suspend configuration information is not included in the RRC connection release message, the UE 1f-01 may transition to an RRC idle mode (1f-15).

According to an embodiment of the disclosure, the UE 1f-01 that has transitioned to the RRC idle mode or the RRC inactive mode as an SNPN access mode may select a CAG or a PLMN (1f-21).

According to an embodiment of the disclosure, the method of selecting the PLMN may follow the above-described embodiment of the disclosure.

According to an embodiment of the disclosure, when the UE 1f-01 selects the CAG, an AS layer of the UE 1f-01 may scan all RF channels in an NR band according to capabilities thereof on request from a NAS layer of the UE 1f-01 and find one or more available CAGs (In the UE on request of NAS, the AS shall scan all RF channels in the NR bands according to its capabilities to find available CAGs). On each carrier, the UE 1f-01 may at least search for a cell with the strongest signal, read system information from the cell, and report one or more PLMNs and one or more CAG IDs thereof to the NAS layer. When a human-readable network name (HRNN) is broadcast in the system information, the AS layer of the UE 1f-01 may also report the received HRNN to the NAS layer (On each carrier, the UE shall at least search for the strongest cell, read its system information and report available CAG ID(s) together with their HRNN (if broadcast) and PLMN(s) to the NAS). An upper layer may select a CAG and notify this to the AS layer.

The UE 1f-01 may receive or obtain system information (1f-20) and perform a cell selection process (1f-25). That is, the UE 1f-01 may receive or obtain at least one MIB and SIB1 and perform the cell selection process to camp on to a suitable cell belonging to the selected CAG. Specifically, Condition 1 may be determined through a CellAccessRelatedInfo information element broadcast in SIB1.

The CellAccessRelatedInfo information element may include at least one of a plmn-IdentityList information element or an npn-IdentityInfoList information element. The plmn-IdentityList information element may follow the above-described embodiment of the disclosure. npn-IdentityInfoList may include a list of NPN identification information. The total number of PLMNs included in the plmn-IdentityList and npn-IdentityInfoList information elements may be limited not to exceed 12. In the embodiment of the disclosure, the number of PLMNs may be limited by one of the following methods.

The total number of PLMNs (identified by a PLMN identity), PNI-NPNs (identified by a PLMN identity and a CAG-ID), and SNPNs (identified by a PLMN identity and a NID) together in the PLMN-IdentityInfoList and NPN-IdentityInfoList does not exceed 12

The total number of PLMNs (identified by PLMN identity(s) itself in the plmn-IdentityInfoList and NPN-IdentityInfoList) does not exceed 12

An ASN.1 structure for the CellAccessRelatedInfo information element may be represented as follows.

CellAccessRelatedInfo
The IE CellAccessRelatedInfo indicates cell access related information for this cell.
CellAccessRelatedInfo information element

```
-- ASN1START
-- TAG-CELLACCESSRELATEDINFO-START
CellAccessRelatedInfo     ::=      SEQUENCE {
    plmn-IdentityList              PLMN-IdentityInfoList,
    cellReservedForOtherUse        ENUMERATED {true}   OPTIONAL,  --
Need R
    ...,
    [[
    cellReservedForFutureUse-r16   ENUMERATED {true}         OPTIONAL,  --
Need R
    npn-IdentityInfoList-r16       NPN-IdentityInfoList-r16  OPTIONAL   --
Need R
    ]]
}
-- TAG-CELLACCESSRELATEDINFO-STOP
-- ASN1STOP
```

According to the RAN sharing structure in the NPN according to the embodiment of the disclosure, the npn-IdentityInfoList information element may include only cag-IdentityList, only nid-List (NPN identity defining SNPN), or cag-IdentityList and nid-List. When NG-RAN is shared by one or more PNI-NPNs, or when one or more PNI-NPNs are shared with one or more PLMNs included in the plmn-IdentityList information, only cag-IdentityList may be included in npn-IdentityInfoList.

Similarly, when NG-RAN is shared by one or more SNPNs, or when one or more SNPNs are shared with one or more PLMNs included in the plmn-IdentityList information, only nid-List may be included in npn-IdentityInfoList.

When NG-RAN is shared by one or more PNI-NPNs and one or more SNPNs, cag-IdentityList and nid-List may be included in npn-IdentityInfoList. In this case, one or more PLMNs may not be included in the plmn-IdentityList information for regular access.

When NG-RAN is shared by one or more PNI-NPNs, one or more PNI-NPNs or one or more PLMNs, or one or more SNPNs, cag-IdentityList and nid-List may be included in plmn-IdentityList and npn-IdentityInfoList.

cag-IdentityList may include one or more CAG-Identities.
An information element for each CAG-Identity may include plmn-IdentityList (which may be indicated by npn-IdentityList) including one or more PLMN identities (or NPN identities) and cag-identityList mapped to each PLMN identity (or NPN identity) in order to include the identities of one or more PNI-NPNs. That is, the CAG-Identity information element may include at least one of the following parameters.
CellIdentity value
plmn-IdentityList (npn-IdentityList) including one or more plmn identifiers Each plmn identifier may be a plmn-Identity value or a plmn-index value. For example, when the plmn-Identity value included in plmn-IdentityList (an information element different from npn-IdentityInfoList) of SIB1 is used identically, the plmn-index value may be included, and otherwise, the plmn-Identity value itself may be included. The plmn-index value is an integer value and may be determined by the following description.

The PLMN index is defined as b1 + b2 + ... + b(n − 1) − i for the PLMN included at the n-th entry of PLMN-IdentityInfoList and the i-th entry of its corresponding PLMN-IdentityInfo, where b(j) is the number of PLMN-Identity entries in each PLMN-IdentityInfo, respectively.

cag-IdentityList indicating a list of CAG identifiers mapped to each plmn-Identity value or plmn-index value
Tracking area code
ranac indicating LAN area code
Indicator (cellReservedForOperatorUse) indicating whether cell is reserved for operator use. This indicator may be applied to all plmns included in CAG-Identity.
Indicator (cellReservedForFutureUse) indicating whether cell is reserved for future use. This indicator may be applied to all plmns included in CAG-IdentityInfo.

The UE 1f-01 that has camped on a suitable cell may perform a cell re-selection process (1f-30). That is, the UE 1f-01 may re-select a cell based on SIB2, SIB3, SIB4, SIB5, SIB6, and the like including a cell re-selection parameter.

In operation 1f-35, the UE 1f-01 may initiate an RRC connection for a certain reason or in order to transmit and receive data to and from the gNB 1f-02. Specifically, in operation 1f-35, when the UE 1f-01 is in the RRC idle mode, the UE 1f-01 may perform an RRC connection establishment procedure with the gNB 1f-02.

The UE 1f-01 in the RRC idle mode may establish reverse synchronization with the gNB 1f-02 and transmit an RRC connection establishment request message (RRCSetupRequest message) to the gNB 1f-02 (1f-40). The RRC connection establishment request message may include a UE identifier (ue-Identity) and an RRC connection establishment cause (establishmentCause).

When the gNB 1f-02 successfully receives the RRC connection establishment request message, the gNB 1f-02 may transmit an RRC connection setup message (RRCSetup message) to the UE 1f-01 (1f-45). The RRC connection setup message may include radio resource configuration information (radioBearerConfig) and master cell group configuration information (masterCellGroup).

When the UE 1f-01 successfully receives the RRC connection setup message, the UE 1f-01 may apply configuration information included in the RRC connection setup message and transition to the RRC connected mode (1f-50). A current cell may be regarded as a PCell.

The UE 1f-01 that has transitioned to the RRC connected mode may transmit an RRC connection setup complete message (RRCSetupComplete message) to the gNB 1f-02 by including the following content in the RRC connection setup complete message (1f-55).

In the embodiment of the disclosure, selectedPLMN-Identity may be set to PLMN selected by upper layers from among one or more PLMNs included in plmn-IdentityList or npn-IdentityInfoList broadcast in SIB1, and selectedPLMN-Identity may be included in the RRC connection setup complete message. At this time, in operation 1f-21, 1f-25, or 1f-30, the method of setting selectedPLMN-Identity may be different according to the case of selecting the CAG cell (condition that satisfies the suitable cell, e.g., Condition 1-1, Condition 2, or Condition 3), or the case of selecting the cell for regular access (condition that satisfies the suitable cell, e.g., Condition 1-2, Condition 2, or Condition 3).

Case 1: When the CAG cell is selected, the selected PLMN and the CAG ID may be included in the RRC connection setup complete message.

The PLMN index selected considering the plmn-IdentityList and npn-IdentityInfoList fields included in SIB1 may be included. (Index of the PLMN selected by the UE from the plmn-IdentityList and npn-IdentityInfoList fields included in SIB1)

Because PNI-NPN may be identified by a combination of the PLMN identity (or NPN identity) and the CAG ID, the CAG ID included in the UE's allowed CAG list for the selected PLMN may be included in the NAS message (due to security issue). For example, the NAS message may refer to dedicatedNAS-Message, which is a message included in the RRC connection setup complete message.

TABLE 2

| PLMN-IdentityInfoList | PLMN-IdentityInfo 1 | 2 PLMN-Identities |
|---|---|---|
| | PLMN-IdentityInfo 2 | 2 PLMN-Identities |
| NPN-IdentityInfoList | NPN-IdentityInfo 1 | 2 cag-Identites |
| | NPN-IdentityInfo 2 | 2 cag-Identites |
| NPN-IdentityInfoList | NPN-IdentityInfo 3 | 2 NID |
| | NPN-IdentityInfo 4 | 2 NID |

Case 2: The case of selecting cell for regular access

The PLMN index selected considering only the plmn-IdentityList field included in SIB1 may be included. (Index of the PLMN selected by the UE from the plmn-IdentityList included in SIB1)

In operation 1f-35, when the UE 1f-01 is in the RRC inactive mode, the UE 1f-01 may perform an RRC connection resume procedure with the gNB 1f-02.

The UE 1f-01 in the RRC inactive mode may establish reverse synchronization with the gNB 1f-02 and transmit an RRC connection resume request message (RRCResumeRequest or RRCResumeRequest1 message) to the gNB 1f-02 (1f-40). The RRC connection resume request message may include a UE identifier (resumeIdentity), a resume message authentication code for integrity (hereinafter, referred to as resumeMAC-1), a resume cause (resumeCause), and the like.

When the gNB 1f-02 successfully receives the RRC connection resume request message, the gNB 1f-02 may transmit an RRC connection resume message (RRCResume message) to the UE 1f-01 (1f-45). The RRC connection resume request message may include at least one of radio resource configuration information (radioBearerConfig), master cell group configuration information (masterCellGroup), measurement configuration information (measConfig), an indicator (fullConfig) indicating full configuration, second radio resource configuration information (radioBearerConfig2), or a sk-Counter value.

When the UE 1f-01 successfully receives the RRC connection resume message, the UE 1f-01 may apply configuration information included in the RRC connection resume message and transition to the RRC connected mode (1f-50). A current cell may be regarded as a PCell.

The UE 1f-01 that has transitioned to the RRC connected mode may transmit an RRC connection resume complete message (RRCResumeComplete message) to the gNB 1f-02 (1f-55). The RRC connection resume complete message may include PLMN information and/or CAG ID selected according to the above-described option.

FIG. 1G is a diagram describing a procedure, performed by a UE in an RRC inactive mode (RRC_INACTIVE) or an RRC idle mode (RRC_IDLE), of establishing an RRC connection by accessing an SNPN cell in an SNPN in a next-generation mobile communication system, according to an embodiment of the disclosure.

The SNPN according to an embodiment of the disclosure may refer to a network that does not rely on network functions provided by a PLMN and is operated by an NPN operator (SNPN is operated by an NPN operator and not relying on network functions provided by a PLMN). Therefore, when the UE is set to operate in the SNPN access mode, the UE may not perform a normal PLMN selection process (When the UE is set to operate in SNPN access mode the UE does not perform normal PLMN selection procedures).

The UE operating in the SNPN access mode may receive one or more available PLMN IDs and a list of available network identifiers (NIDs) from broadcast system information, and take them into account during a network selection process (UEs operating in SNPN access mode read the available PLMN IDs and list of available NIDs from the broadcast system information and take them into account during network selection).

That is, an SNPN-enabled UE may be configured with subscriber identifiers and credentials for one or more SNPNs identified by a combination of PLMN ID and NID, and thus, may support the SNPN access mode (An SNPN-enabled UE is configured with subscriber identifiers and credentials for one or multiple SNPNs identified by the combination of PLMN ID and NID, so can support the SNPN access mode). The UE that is set to operate in the SNPN access mode may regard a cell as a suitable cell when the following conditions are satisfied.

Condition 1: A case in which the cell belongs to the SNPN selected or registered by the UE (the cell is part of either the selected SNPN or the registered SNPN of the UE).

Condition 2: A case in which the cell satisfies the cell selection criteria.

The cell selection criteria may mean Equation 1 below.

$$Srxlev>0 \text{ AND } Squal>0 \qquad \text{Equation 1}$$

where:

$$Srxlev=Qrxlevmeas-(Qrxlevmin+Qrxlevminoffset)-Pcompensation-Qoffsettemp$$

$$Squal=Qqualmeas-(Qqualmin+Qqualminoffset)-Qoffsettemp$$

For the definitions of parameters used in Equation 1, refer to 3GPP standard document "38.304: User Equipment (UE) procedures in idle mode." The parameters may be included in system information (e.g., SIB1 or SIB2) broadcast by the cell. Hereinafter, the definitions of the above-described parameters may be equally applied to embodiments of the disclosure to which Equation 1 is applied.

Condition 3: A case in which the cell is not barred according to information that is most recently provided from the NAS layer, and the cell is part of at least one tracking area (TA) that is not part of the list of "forbidden tracking areas" which belongs to an SNPN that satisfies Condition 1 (The cell is part of at least one TA that is not part of the list of "forbidden Tracking Areas" which belongs to either the selected SNPN or the registered SNPN of the UE).

According to an embodiment of the disclosure, the case in which the cell is barred may refer to at least one of a case in which a 'cellBarred' indicator is set to "barred" in at least MIB, a case in which a Rel-16 "cellReservedForOperatorUse" indicator is set to "reserved" in SIB1, or a case in which a Rel-16 "cellReservedForOperatorUse" indicator is set to "reserved." However, the case in which the cell is barred is not limited to the above-described examples.

Referring to FIG. 1G, a UE 1g-01 may be in an RRC connected mode (RRC_CONNECTED) by establishing an RRC connection with a gNB 1g-02 (1g-05).

When there is no data transmission or reception for certain reasons or for a certain time, the gNB 1g-02 may transmit an RRC connection release message (RRCRelease) to the UE 1g-01 (1g-10). When suspend configuration information (suspendConfig) is included in the RRC connection release message, the UE 1g-01 may transition to an RRC inactive mode, and when the suspend configuration information is not included in the RRC connection release message, the UE 1g-01 may transition to an RRC idle mode (1g-15).

The UE 1g-01 that has transitioned to the RRC idle mode or the RRC inactive mode set to an SNPN access mode may select an SNPN (1g-21). For example, an AS layer of the UE 1g-01 may scan all RF channels in an NR band according to capabilities thereof on request from a NAS layer of the UE 1g-01 and find one or more available SNPNs (In the UE on request of NAS, the AS shall scan all RF channels in the NR bands according to its capabilities to find available SNPNs).

On each carrier, the UE 1g-01 may at least search for a cell with the strongest signal, read system information from the cell, and report one or more SNPNs to the NAS layer. For example, when an HRNN is broadcast in the system information, the AS layer of the UE 1g-01 may also report the received HRNN to the NAS layer (On each carrier, the UE shall at least search for the strongest cell, read its system information and report SNPN identifiers together with their HRNN (if broadcast) to the NAS). An upper layer may select an SNPN and notify this to the AS layer.

The UE 1g-01 may receive or obtain system information (1g-20) and perform a cell selection process (1g-25). That is, the UE 1g-01 may receive or obtain at least MIB and SIB1 and perform the cell selection process to camp on to a suitable cell belonging to the selected CAG. Specifically, Condition 1 may be determined through a CellAccessRelatedinfo information element broadcast in SIB1.

The CellAccessRelatedInfo information element may include at least one of a plmn-IdentityList information element or an npn-IdentityInfoList information element. The plmn-IdentityList information element may follow the above-described embodiment of the disclosure. npn-IdentityInfoList may include a list of NPN identification information. The total number of PLMNs included in the plmn-IdentityList and npn-IdentityInfoList information elements may be limited not to exceed 12. In the embodiment of the disclosure, the number of PLMNs may be limited by one of the following methods.

---

The total number of PLMNs (identified by a PLMN identity), PNI-NPNs (identified by a PLMN identity and a CAG-ID), and SNPNs (identified by a PLMN identity and a NID) together in the PLMN-IdentityInfoList and NPN-IdentityInfoList does not exceed 12

The total number of PLMNs (identified by PLMN identity(s) itself in the plmn-IdentityInfoList and NPN-IdentityInfoList) does not exceed 12

---

An ASN.1 structure for the CellAccessRelatedInfo information element may be represented as follows.

---

CellAccessRelatedInfo
The IE CellAccessRelatedInfo indicates cell access related information for this cell.
CellAccessRelatedInfo information element

---

```
-- ASN1START
-- TAG-CELLACCESSRELATEDINFO-START
CellAccessRelatedInfo   ::=         SEQUENCE {
    plmn-IdentityList               PLMN-IdentityInfoList,
    cellReservedForOtherUse             ENUMERATED {true}  OPTIONAL, -- Need R
    ...,
    [[
    cellReservedForFutureUse-r16  ENUMERATED {true}       OPTIONAL, -- Need R
    npn-IdentityInfoList-r16      NPN-IdentityInfoList-r16         OPTIONAL -- Need R
    ]]
}
-- TAG-CELLACCESSRELATEDINFO-STOP
-- ASN1STOP
```

According to the RAN sharing structure in the NPN according to the embodiment of the disclosure, the npn-IdentityInfoList information element may include only cag-Identity related information, only snpn-Identity related information, or cag-Identity related information and snpn-Identity related information.

When NG-RAN is shared by one or more PNI-NPNs, or when one or more PNI-NPNs are shared with one or more PLMNs included in the plmn-IdentityList information, only cag-Identity related information may be included in npn-IdentityInfoList.

Similarly, when NG-RAN is shared by one or more SNPNs, or when one or more SNPNs are shared with one or more PLMNs included in the plmn-IdentityList information, only snpn-Identity related information may be included in npn-IdentityInfoList.

When NG-RAN is shared by one or more PNI-NPNs and one or more SNPNs, cag-Identity related information and snpn-Identity related information may be included in npn-IdentityInfoList. In this case, one or more PLMNs may not be included in the plmn-identityList information for regular access. When NG-RAN is shared by one or more PNI-NPNs, one or more PNI-NPNs or one or more PLMNs, or one or more SNPNs, cag-Identity related information and snpn-Identity related information may be included in plmn-IdentityList and npn-IdentityInfoList.

The snpn-Identity related information may include one or more SNPN-Identity information elements.

Each snpn-Identity related information element may include a plurality of PLMN identities and a list of NIDs mapped to the corresponding PLMN identities in order to include a plurality of SNPN identities. That is, the snpn-Identity related information element may include at least one of the following parameters.

CellIdentity value plmn-Identity value or plmn-index value. For example, when the plmn-Identity value included in plmn-IdentityList of SIB1 is used identically, the plmn-index value may be included, and otherwise, the plmn-Identity value itself may be included. This is because plmn-identity used for SNPN may be the same as the plmn-Identity value included in plmn-IdentityList because PLMN used for regular access may be used identically. The plmn-index value is an integer value and may be determined by the following description.

---

The PLMN index is defined as b1 + b2 ... + b(n − 1) + i for the PLMN included at the n-th entry of PLMN-IdentityInfoList and the i-th entry of its corresponding PLMN-IdentityInfo, where b(j) is the number of PLMN-Identity entries in each PLMN-IdentityInfo, respectively.

--- plmn-Identity value or NID mapped to plmn-index value

Tracking area code ranac indicating LAN area code

Indicator (cellReservedForOperatorUse) indicating whether cell is reserved for operator use. This indicator may be applied per plmn.

Indicator (cellReservedForFutureUse) indicating whether cell is reserved for future use. This indicator may be applied to the plmn.

The UE 1g-01 that has camped on a suitable cell may perform a cell re-selection process (1g-30). That is, the UE 1g-01 may re-select a cell based on SIB2, SIB3, SIB4, SIB5, SIB6, and the like including a cell re-selection parameter.

In operation 1g-35, the UE 1g-01 may initiate an RRC connection for a certain reason or in order to transmit and receive data to and from the gNB 1g-02. Specifically, in operation 1g-35, when the UE 1g-01 is in the RRC idle mode, the UE 1g-01 may perform an RRC connection establishment procedure with the gNB 1g-02.

The UE 1g-01 in the RRC idle mode may establish reverse synchronization with the gNB 1g-02 and transmit an RRC connection establishment request message (RRCSetupRequest message) to the gNB 1g-02 (1g-40). The RRC connection establishment request message may include a UE identifier (ue-Identity) and an RRC connection establishment cause (establishmentCause).

When the gNB 1g-02 successfully receives the RRC connection establishment request message, the gNB 1g-02 may transmit an RRC connection setup message (RRCSetup message) to the UE 1g-01 (1g-45). The RRC connection setup message may include radio resource configuration information (radioBearerConfig) and master cell group configuration information (masterCellGroup).

When the UE 1g-01 successfully receives the RRC connection setup message, the UE 1g-01 may apply configuration information included in the RRC connection setup message and transition to the RRC connected mode (1g-50). The UE 1g-01 may regard a current cell as a PCell.

The UE 1g-01 that has transitioned to the RRC connected mode may transmit an RRC connection setup complete message (RRCSetupComplete message) to the gNB 1g-02 by including the following content in the RRC connection setup complete message (1g-55).

In the embodiment of the disclosure, selectedPLMN-Identity may be set to PLMN selected by upper layers from among one or more PLMNs included in plmn-IdentityList or npn-IdentityInfoList broadcast in SIB1 (set the selectedPLMN-Identity to the PLMN selected by upper layers from the PLMN(s) included in the plmn-IdentityList or npn-IdentityInfoList in SIB1), and selectedPLMN-Identity may be included in the RRC connection setup complete message.

At this time, when a suitable SNPN cell is selected in operation 1g-21, 1g-25, or 1g-30, it is proposed to include the selected SNPN information in the RRC connection setup complete message. In this case, the method of setting the selectedPLMN-Identity in the RRC connection setup complete message by one of the following options may be different.

PLMN index selected considering plmn-IdentityList and npn-IdentityInfoList fields included in SIB1 together is included (Index of the PLMN selected by the UE from the plmn-IdentityList and npn-IdentityInfoList fields included in SIB1).

SNPN may be identified by a combination of the PLMN identity and the NID. Therefore, because the PLMN and the NID are mapped one-to-one, the NID may not be included in the RRC connection release message. When the method 2 or 3 is applied, the selected PLMN and the NID or NID list mapped thereto (which may be supported by the UE) may be included in the RRC connection setup complete message. The NID or NID list may be included in the NAS message contained in the RRC connection setup complete message, or may be included in the RRC connection setup complete message itself.

TABLE 3

| PLMN-IdentityInfoList | PLMN-IdentityInfo 1 | 2 PLMN-Identities |
|---|---|---|
|  | PLMN-IdentityInfo 2 | 2 PLMN-Identities |
| NPN-IdentityInfoList | NPN-IdentityInfo 1 | 2 cag-Identites |
|  | NPN-IdentityInfo 2 | 2 cag-Identites |

TABLE 3-continued

| NPN-IdentityInfoList | NPN-IdentityInfo 3 | 2 NID |
| | NPN-IdentityInfo 4 | 2 NID |

In operation 1g-35, when the UE 1g-01 is in the RRC inactive mode, the UE 1g-01 may perform an RRC connection resume procedure with the gNB 1g-02.

The UE 1g-01 in the RRC inactive mode may establish reverse synchronization with the gNB 1g-02 and transmit an RRC connection resume request message (RRCResumeRequest or RRCResumeRequest1 message) to the gNB 1g-02 (1g-40). The RRC connection resume request message may include a UE identifier (resumeIdentity), a resume message authentication code for integrity (hereinafter, referred to as resumeMAC-I), a resume cause (resumeCause), and the like.

When the gNB 1g-02 successfully receives the RRC connection resume request message, the gNB 1g-02 may transmit an RRC connection resume message (RRCResume message) to the UE 1g-01 (1g-45). The RRC connection resume message may include at least one of radio resource configuration information (radioBearerConfig), master cell group configuration information (masterCellGroup), measurement configuration information (measConfig), an indicator (fullConfig) indicating full configuration, second radio resource configuration information (radioBearerConfig2), or a sk-Counter value.

When the UE 1g-01 successfully receives the RRC connection resume message, the UE 1g-01 may apply configuration information included in the RRC connection resume message and transition to the RRC connected mode (1g-50). A current cell may be regarded as a PCell.

The UE 1g-01 that has transitioned to the RRC connected mode may transmit an RRC connection resume complete message (RRCResumeComplete message) to the gNB 1g-02 (1g-55). The RRC connection resume complete message may include PLMN information and/or NID selected according to the above-described option.

In this specification, the flow of the case in which the UE performs regular access has been described with reference to FIG. 1E, the flow of the case in which the UE performs the access to the PNI-NPN has been described with reference to FIG. 1F, and the flow of the case in which the UE performs the access to the SNPN has been described with reference to FIG. 1G. The above-described contents are summarized as follows.

First, the cell type may be summarized as shown in Table 4 below.

TABLE 4

| Cell Type | Description |
| --- | --- |
| NPN-only Cell | A cell that provides access to only NPN UE |
| Shared Cell | A cell that provides access to both normal UE and NPN UE |
| Public Network-only Cell (PN-only Cell) | A cell that provides access to only normal UE |

As the setting for the NPN-only cell, SIB1 provides CellAccessRelatedInfo as follows and is set as follows.
cellReservedForOtherUse is set to true
Setting related information in n n-IdentityInfoList

```
CellAccessRelatedInfo ::=      SEQUENCE {
    plmn-IdentityList          PLMN-IdentityInfoList,
    cellReservedForOtherUse        ENUMERATED {true}       OPTIONAL, --
Need R
    ...,
    [[
    cellReservedForFutureUse-r16   ENUMERATED {true}       OPTIONAL, --
Need R
    npn-IdentityInfoList-r16   NPN-IdentityInfoList-r16   OPTIONAL       -- Need R
    ]]
}
```

TABLE 5

CellAccessRelatedInfo field descriptions cellReservedForFutureUse
Indicates whether the cell is reserved, as defined in 38.304 [20]
for future use. The field is applicable to all PLMNs and NPNs.
cellReservedForOtherUse
Indicates whether the cell is reserved, as defined in 38.304 [20].
The field is applicable to all PLMNs.
npn-IdentityInfoList
The npn-IdentityInfoList is used to configure a set of NPN-IdentityInfo elements. Each of those elements contains a list of one or more NPN Identities and additional information associated with those NPNs. The total number of PLMNs (identified by a PLMN identity in plmn-IdentityList), PNI-NPNs (identified by a PLMN identity and a CAG-ID), and SNPNs (identified by a PLMN identity and a NID) together in the PLMN-IdentityInfoList and NPN-IdentityInfoList does not exceed 12, except for the NPN-only cells. In case of NPN-only cells the PLMN-IdentityList contains a single element that does not count to the limit of 12. The NPN Index is defined as B + FFS, where B is the index used for the last PLMN in the PLMNIdentittyInfoList. In NPN-only cells B is considered 0.
plmn-IdentityList
The plmn-IdentityList is used to configure a set of PLMN-IdentityInfoList elements. Each of those elements contains a list of one or more PLMN Identities and additional information associated with those PLMNs. A PLMN-identity can be included only once, and in only one entry of the PLMN-IdentifyInfoList. The PLMN index is defined as b1 + b2 + . . . + b(n − 1) + i for the PLMN included at the n-th entry of PLMN-IdentityInfoList and the i-th entry of its corresponding PLMN-IdentityInfo, where b(j) is the number of PLMN-Identity entries in each PLMN-IdentityInfo, respectively.

The UE type may be summarized as shown in Table 6 below.

TABLE 6

| UE Type | Description |
| --- | --- |
| UE operating in SNPN access mode | Referred to as SNPN UE Can access to NPN-only cell |
| UE not operating in SNPN access mode | |
| >UE not configured with allowed CAG list | Referred to as normal UE Can access to shared cell or PN-only cell |
| >UE configured with allowed CAG list and with CAG-only indication | Referred to as CAG-only UE Can access to NPN-only cell |
| >UE configured with allowed CAG list but w/o CAG-only indication | Referred to as CAG-also UE Can access to shared cell or NPN-only cell |

The operation of the UE expected for each system may be summarized as shown in Table 7 below.

TABLE 7

UE operation expected fix each system

| | UE operating in SNPN access mode | | UE not operating in SNPN access mode | |
| --- | --- | --- | --- | --- |
| | SNPN UE | Normal UE | CAG only UE | CAG also UE |
| PLMN/SNPN selection | SNPN selection | PLMN selection | PLMN selection | PLMN selection |
| Registered to | Selected SNPN | Selected PLMN | Selected PLMN | Selected PLMN |
| Operation of as layer AS layer task for PLMN selection | Select SNPN identity from NPN-IdentityInfoList | Select PLMN identity from PLMN-IdentityInfoList | Select PLMN identity from NPN-IdentityInfoList | NOTE*(See below) |
| Cell reselection to | NPN-only cell | shared cell or PN-only cell | NPN-only cell | NPN-only cell, shared cell or PN-only cell |
| TAC/CellIdentity check | From NPN-IdentityInfo | From PLMN-IdentityInfo | From NPN-IdentityInfo | NOTE* |
| Access to | Access only to NPN-only cell | Access either to PN-only or shared cell | Access only to NPN-only cell | Access either to PN-only or shared cell* |

The motivation of CAG also UE would be to prioritize the CAG access if the shared cell provides both normal access and CAG access (i.e., select PLMN in NPN list when both lists contains selected PLMN).

Contents included in SIB1 according to the above-described cell type may be summarized as shown in Table 8 below.

TABLE 8

Contents included in SIB1 according to cell type

| | PLMN-IdentityInfoList | NPN-IdentityInfoList | cellReservedForOtherUse | cellReservedForFutureUse |
| --- | --- | --- | --- | --- |
| NPN-only Cell | Including** (See below) | Including | Including | Including or not including |
| Shared Cell | Including | Including | Not including | Including or not including |
| PN-only Cell | Including | Not including | Including or not including | N/A |

The cell type indication method and access restriction according to the above-described cell type may be summarized as shown in Table 9 below.

TABLE 9

Cell type indication method and access restriction

| | SNPN UE | Normal UE | CAG only | CAG also | Cell type indication method |
| --- | --- | --- | --- | --- | --- |
| NPN-only Cell | | Barred | | | Provide NPN-IdentifyInfoList to SIB1 and set cellReservedForOtherUse to True |
| Shared Cell | | | | | Provide NPN-IdentifyInfoList |
| PN-only Cell | Barred | | Barred | | Not provide NPN-IdentifyInfoList |

FIG. 1H is a diagram illustrating a UE operation in which a UE accesses a NPN cell according to an embodiment of the disclosure.

Referring to FIG. 1H, the summary of the UE's regular access, access to the PNI-NPN, and access to the SNPN is referred to, and an accurate UE operation is proposed.

In operation 1h-05, the UE may perform a cell selection/re-selection process. In this case, the UE may receive or obtain at least MIB and SIB1 and perform the cell selection process to camp on to a suitable cell belonging to the selected PLMN. Specifically, this may be determined through a CellAccessRelatedInfo information element broadcast in SIB1.

In operation 1h-10, the UE may perform an operation of identifying parameters included in SIB1, particularly CellAccessRelatedInfo, and then storing parameters to be used to determine whether to use system information stored in another cell (determining validity of system information). This corresponds to an operation in which the UE selects and stores particular information included in SIB1, and the following values may be included in the particular information included in SIB1. Of course, the disclosure is not limited to the following examples.

- areaScope value: An indicator indicating whether system information is maintained in area units. The corresponding value has one value for each SIB and is set in an SIB-TypeInfo IE in si-SchedulingInfo. The UE stores the corresponding areaScope value indicated for each SIB.
- PLMN-Identity: This stores the first PLMN-Identity among a plurality of PLMN-identity values included in PLMN-IdentityInfoList.
- NPN-Identity: This stores the first NPN-Identity among a plurality of NPN-Identity values included in NPN-IdentityInfoList. (For reference, NPN-Identity indicates SNPN identity in the case of SNPN, and indicates PNI-NPN identity in the case of PNI-NPN.)
- cellIdentity: This stores the cellIdentity value included in PLMN-IdentityInfoList including the selected PLMN-Identity and NPN-Identity. That is, cellIdentity corresponds to a cellIdentity value included in the first PLMN-IdentityInfo or NPN-IdentityInfo among a plurality of PLMN-identity values included in PLMN-IdentityInfoList.
- systemInformationAreaID: This is one value stored in SIB1 and is applied to all SIBs broadcast in the corresponding cell. systemInformationAreaID is directly included in an SI-SchedulingInfo IE. System information broadcast in the cell set to the corresponding value is a unique area ID in PLMN, and the same system information is applied to cells using the same area ID.
- ValueTag: This is a parameter indicating whether system information has changed from a previously broadcast value and is defined as a value between 0 and 31. The corresponding values are also set for each SIB and is included in an SIB-TypeInfo IE in si-SchedulingInfo, and the UE stores all values.

TABLE 10

| What is stored | IE level/place/multiplicity |
| --- | --- |
| areaScope | One areaScope Per SIB, under SIB-TypeInfo under si-SchedulingInfo |
| PLMN-Identity | Multiple PLMN-identities in PLMN-IdentityInfoList |
| cellIdentity | Multiple cellIdentity in PLMN-IdentityInfoList |
| systemInformationAreaID | One systemInformationAreaID for all SIBs, under SI-SchedulingInfo |
| valueTag | One valueTag per SIB, under SIB-TypeInfo under si-SchedulingInfo |

The following ASN.1 code is added for structural description of fields and IEs in the disclosure and may be referred to.

```
CellAccessRelatedInfo    ::=           SEQUENCE {
    plmn-IdentityList         PLMN-IdentityInfoList,
    cellReservedForOtherUse              ENUMERATED {true} OPTIONAL,         --
Need R
    ...,
    [[
    cellReservedForFutureUse-r16             ENUMERATED {true} OPTIONAL,         -
- Need R
    npn-IdentityInfoList-r16         NPN-IdentityInfoList-r16 OPTIONAL         -- Need
R
    ]]
}
NPN-IdentityInfoList-r16 ::=          SEQUENCE (SIZE (1..maxNPN-r16)) OF NPN-
IdentityInfo-r16
NPN-IdentityInfo-r16 ::=           SEQUENCE {
    npn-IdentityList-r16          SEQUENCE (SIZE (1..maxNPN-r16)) OF NPN-
Identity-r16,
        trackingAreaCode-r16            TrackingAreaCode,
        ranac-r16           RAN-AreaCode
OPTIONAL,         -- Need R
        cellIdentity-r16          CellIdentity,
        cellReservedForOperatorUse-r16              ENUMERATED {reserved, notReserved},
    ...
}
NPN-Identity-r16 ::=           CHOICE {
    pni-npn-r16          SEQUENCE {
        plmn-Identity-r16             PLMN-Identity,
        cag-IdentityList-r16            SEQUENCE (SIZE (1..maxNPN-r16)) OF
CAG-Identity-r16
    },
    snpn-r16          SEQUENCE{
        plmn-Identity             PLMN-Identity,
        nid-List-r16          SEQUENCE (SIZE (1..maxNPN-r16)) OF NID-r16
    }
}
CAG-Identity-r16 ::=           BIT STRING (SIZE (32))
NID-r16 ::=          BIT STRING (SIZE (52))
PLMN-IdentityInfoList ::=             SEQUENCE (SIZE (1..maxPLMN)) OF PLMN-
IdentityInfo
```

```
PLMN-IdentityInfo ::=              SEQUENCE {
    plmn-IdentityList              SEQUENCE (SIZE (1..maxPLMN)) OF PLMN-
Identity,
    trackingAreaCode               TrackingAreaCode
OPTIONAL,         -- Need R
    ranac                          RAN-AreaCode
OPTIONAL,         -- Need R
    cellIdentity                   CellIdentity,
    cellReservedForOperatorUse                      ENUMERATED {reserved, notReserved},
    ...,
    [[
    iab-Support-r16                ENUMERATED {true}
OPTIONAL          -- Need R
    ]]
}
```

In operation 1h-15, the UE may select a first tracking area code (TAC), a first cell identity, and a first ranac, which are associated with at least one of the selected PLMN or SNPN. Also, when the UE determines the validity of the system information and determines the validity of the selected TA and cell and the ranac, the UE may use at least one of the selected pieces of information (the associated first tracking area code (TAC), the first cell identity, and the first ranac). In the disclosure, the processes are classified according to the network type and the UE type applied in this operation.

1. First condition: This corresponds to a PN-only cell, which is a cell that permits the access only to the normal UE. That is, this is a case in which NPN-IdentityInfoList is not included in cellAccessRelatedInfo of SIB1 of the corresponding cell.

Method 1 below is applied.

2. Second condition: This corresponds to a shared cell, which is a cell that both the normal UE and the NPN UE are able to access.

A. (2-1)-th condition: A case in which the CAG-only UE accesses the corresponding cell Method 2 below is applied.

B. (2-2)-th condition: A case in which the CAG-also UE and the normal UE access the corresponding cell Method 1 below is applied.

C. (2-3)-th condition: A case in which the NPN-only UE accesses the corresponding cell Method 2 below is applied.

3. Third condition: This corresponds to an NPN-only cell, which is a cell that only the NPN UE is able to access. That is, this is a case in which NPN-IdentityInfoList is included in cellAccessRelatedInfo of SIB1 of the corresponding cell and cellReservedForOtherUse is set to true.

Method 2 below is applied.

As described above, the UE differently selects and applies the following parameters according to a network selection condition.

1. Method 1: The corresponding UE applies PLMN-IdentityInfo and uses the related values in a subsequent procedure. That is, trackingAreaCode, rnaac, and cellIdentity included in plmn-IdentityList are selected as a first TAC, a first RNAAC, and a first cellIdentity.

(in the remainder of the procedures use plmn-IdentityList, trackingAreaCode, rnaac and cellIdentity for the cell as received in the corresponding PLMN-IdentityInfo containing the selected PLMN;)

2. Method 2: The corresponding UE applies NPN-IdentityInfo and uses the related values in a subsequent procedure. That is, trackingAreaCode, rnaac, and cellidentity included in npn-IdentityList are selected as a first TAC, a first RNAAC, and a first cellidentity.

(in the remainder of the procedures use npn-Identity, trackingAreaCode, rnaac and cellidentity for the cell as received in the corresponding NPN-IdentityInfo containing the selected NPN;)

In operation 1h-20, the UE may use the first TAC and the first cell identity selected in operation 1h-15 to perform an operation of determining whether the selected TA and cell are barred and whether TA update is required. More specifically, the operation of the UE in operation 1h-20 may mean an operation of referring to information received from the NAS layer to determining whether the selected first TAC exists in the forbidden-TA list and whether the selected first cell identity exists in the forbidden-cell list. Also, the UE may compare whether the selected first TAC is included in the valid TA list and determine whether the TA update is required, based on whether the selected first TAC is included in the valid TAC.

In operation 1h-25, depending on whether the UE has selected SNPN or PLMN, when the selected PLMN is included in npn-IdentityInfoList, the UE may display, on a user screen, an HRNN associated with the selected PLMN. Therefore, the UE may transfer, to the NAS, HRNN information received from the SIB.

In operation 1h-25, the HRNN information may be transmitted to the NAS through the following ASN.1 code, and the HRNN information may be mapped one-to-one to each NPN identity included in npn-IdentityInfoList. That is, the HRNN information mapped to the selected NPN may be transmitted to the NAS. When an n-th entry of HRNN-List is a certain value (e.g., hx00) or a certain size (1 byte or 0 bytes), the same rule of HRNN as an (n−1)-th HRNN may be applied. In this manner, signaling reduction may be obtained by reducing repetitive HRNN downloading.

```
SIB10-r16 ::=          SEQUENCE {
    hrnn-List-r16          HRNN-List-r16           OPTIONAL, -- Need R
    lateNonCriticalExtension   OCTET STRING        OPTIONAL,
    ...
}
```

```
HRNN-List-r16 ::=       SEQUENCE (SIZE (1..maxNPN-r16)) OF HRNN-r16
HRNN-r16 ::=            SEQUENCE {
   hrnn-r16             OCTET STRING (SIZE(1.. maxHRNN-Len-r16))
OPTIONAL    -- Need R
}
```

TABLE 11

SIB10 field descriptions

HRNN-List
The same amount of HRNN elements as the number of NPNs in SIB 1
are included. The n-th entry of HRNN-List contains the human
readable network name of the n-th NPN of SIB1. The corresponding
entry in HRNN-List is absent if there is no HRNN associated with
the given NPN.

In operation 1h-30, the UE may perform an operation of storing the system information for the corresponding cell, and the system information for the corresponding cell may correspond to values used in operations 1h-10 to 1h-25. In particular, the UE may store the first cell identity satisfying the procedure as the second cell identity and may use the first cell identity to determine whether to use system information stored in another cell in the future and determine validity.

In operation 1h-35, the UE may determine whether to update TA and RNA through the stored first cell identity, first TAC, and first RANAC values, and may perform the following operations when necessary. The operation of determining the corresponding operation is a result of operation 1h-20, and operation 1h-35 may be performed simultaneously with operation 1h-30 or may be performed before operation 1h-30.

When only TA update is required, TA update is performed.
When both TA update and RNA update are required, TA update is performed.
When only RNA update is required, RNA update is performed.

Figure 1I:
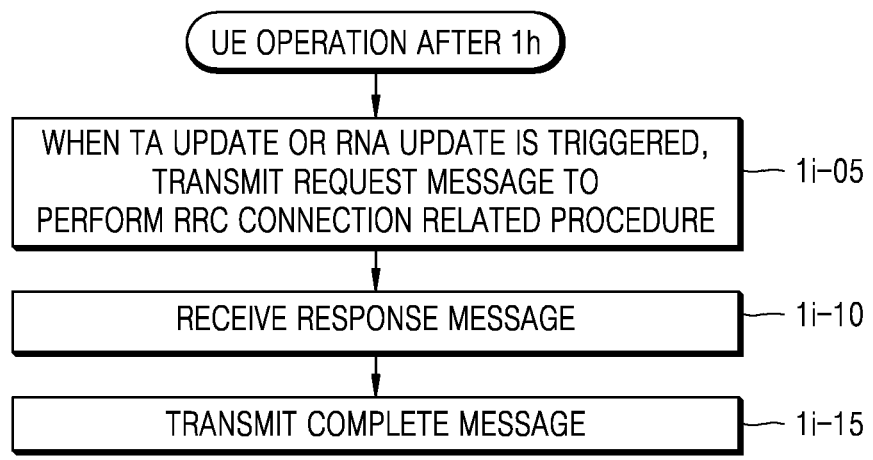
FIG. 1I is a diagram illustrating a UE operation, performed by a UE, of reporting a selected Public Land Mobile Network (PLMN) after the UE is connected to an NPN cell according to an embodiment of the disclosure.

FIG. 1I is a diagram illustrating a UE operation, performed by the UE, of reporting a selected PLMN after the UE is connected to an NPN cell according to an embodiment of the disclosure.

That is, the embodiments of the disclosure propose an operation in which the UE determines whether PLMN or SNPN is selected and whether the selected PLMN belongs to an NPN list or a PLMN list, and includes selectedPLM-NIdentity in an RRCSetupComplete message (or RRCResumeComplete message). In case of the NPN-only cell, PLMN-identityInfoList includes only one element, and PLMN-identityList includes only one PLMN identity. plmn-identity, TAC, and cellIdentity are set to preset values, and RNAAC is not included.

In particular, the UE operation of FIG. 1I may be performed following the UE operation of FIG. 1H. At this time, in operation 1i-05, when TA update or RNA update is triggered, the UE may transmit an RRCSetupRequest or RRCResumeRequest message to perform an RRC connection related procedure.

In operation 1i-10, the UE may receive an RRCSetup or RRCResume message in response to the RRCSetupRequest or RRCResumeRequest message transmitted in operation 1h-05. When RRCRelease and RRCReject messages are received in operation 1h-10, the UE operation accordingly is performed. In the embodiment of the disclosure, the case of receiving the RRCSetup or RRCResume message as the corresponding response message will be described.

In operation 1i-15, when the UE receives the RRCSetup message in operation 1i-10, the UE may perform an operation of generating an RRCSetupComplete message and transmitting the RRCSetupComplete message to the base station. In particular, the following parameters may be included in the RRCSetupComplete message.

selectedPLMN-Identity: PLMN or SNPN index selected for plmn-IdentityList or npn-IdentityInfoList of SIB1
registeredAMF: GUAMI information of AMF where the UE is registered (including PLMN and AMF identifiers)
guami-Type: Information indicating which one of 5G-GUTI and EPS GUTI the GUAMI information is mapped
s-NSSAI-List: Network slice related information
dedicatedNAS-Message: NAS message information is transmitted transparently.
n-5G-S-TMSI-Value: 5G-S-TMSI information
Additional information: indicator and information that may be additionally introduced after Rel-16

```
RRCSetupComplete-IEs ::=    SEQUENCE {
   selectedPLMN-Identity        INTEGER (1..maxPLMN),
   registeredAMF                RegisteredAMF
      OPTIONAL,
   guami-Type                   ENUMERATED {native, mapped}
      OPTIONAL,
   s-NSSAI-List                 SEQUENCE (SIZE (1..maxNrofS-NSSAI)) OF
   S-NSSAI OPTIONAL,
   dedicatedNAS-Message         DedicatedNAS-Message,
   ng-5G-S-TMSI-Value           CHOICE {
      ng-5G-S-TMSI                 NG-5G-S-TMSI,
      ng-5G-S-TMSI-Part2           BIT STRING (SIZE (9))
   }
   OPTIONAL,
   lateNonCriticalExtension     OCTET STRING
      OPTIONAL,
   nonCriticalExtension         RRCSetupComplete-v16xy-IEs
      OPTIONAL
}
```

In particular, in the above operation, the PLMN selected by the UE may be selected from the PLMN list, the SNPN list, or the PMI-NPN list. Therefore, it is necessary for the UE to distinguish them, set the related PLMN index to the selectedPLMN-identity, and transmit the RRCSetupComplete message. Detailed classification and UE operation are as follows.

Case 1: When the SNPN is selected by the upper layer (i.e., the PLMN index associated with the SNPN is selected), the UE sets the PLMN value for the SNPN, selected by the upper layer, to selectedPLMN-Identity. That is, the PLMN value included in npn-IdentityInfoList is selected and set to selectedPLMN-identity.

Case 2: Case in which the PLMN is selected by the upper layer (the corresponding index is selected from the PLMN list other than SNPN).

Case 2-1: When the UE is set to the CAG list and the PLMN included in npn-IdentityInfoList is selected, the UE sets the PLMN value selected by the upper layer to selectedPLMN-Identity. That is, the PLMN value included in npn-IdentityInfoList is selected and set to selectedPLMN-Identity.

Case 2-2: When the UE is not set to the CAG list and the PLMN included in plmn-IdentityInfoList is selected, the UE sets the PLMN value selected by the upper layer to selectedPLMN-Identity. That is, the PLMN value included in plmn-IdentityInfoList is selected and set to selectedPLMN-Identity.

The following table summarizes a method, performed by an SNPN UE and a non-SNPN UE, of selecting a PLMN and a method of setting and transmitting the selected PLMN in a Complete message.

TABLE 12

| | UE operating in SNPN access mode | | UE not operating in SNPN access mode | |
|---|---|---|---|---|
| | SNPN UE | Normal UE | CAG only UE | CAG also UE |
| PLMN selection Identity of selected/registered PLMN | SNPN selection SNPN identity | PLMN selection PLMN identity | PLMN selection PLMN identity | PLMN selection PLMN identity |
| selectedPLMN-Identity | SNPN identity from npn-IdentityInfoList | PLMN identity from plmn-IdentityList | PLMN identity from npn-IdentityInfoList | PLMN identity from plmn-IdentityList Or PLMN identity from npn-IdentityInfoList |

The table below summarizes the above operations as examples of sentences that may be included in the standard document.

TABLE 13

1>set the content of RRCSetupComplete message as follows:
  2>if upper layers provide a 5G-S-TMSI:
    3>if the RRCSetup is received in response to an RRCSetupRequest:
      4>set the ng-5G-S-TMSI-Value to ng-5G-S-TMSI-Part2;

TABLE 13-continued

3>else:
      4>set the ng-5G-S-TMSI-Value to ng-5G-S-TMSI;
  2>if upper layers selected SNPN;
    3> set the selectedPLMN-Identity to the SNPN selected by upper layers (TS 24.501 [23]) from the PLMN(s) included in the npn-IdentityInfoList in SIB1;
  2> else if upper layers selected PLMN;
    3> if UE is configured with CAG list and the selected PLMN is included in npn-IdenityInfoList in SIB1
      4> set the selectedPLMN-Identity to the PLMN selected by upper layers (TS 24.501 [23]) from the PLMN(s) included in the npn-IdentityInfoList in SIB1;
    3> else
      4> set the selectedPLMN-Identity to the PLMN selected by upper layers (TS 24.501 [23]) from the PLMN(s) included in the plmn-IdentityInfoList in SIB1;

Also, when the corresponding cell is a cell supporting SNPN, that is, an NPN-only cell, both plmn-IdentityList and npn-IdentityInfoList-r16 may be included in CellAccessRelatedInfo. In this case, plmn-IdentityList has only one element, and the value of plmn-IdentityList is not included when the number of PLMNs actually applied is calculated (That is, the value of plmn-IdentityList does not count in the total number of limitations). The following two methods are possible because the number of PLMNs for SNPNs included in npn-IdentityInfoList-r16 is a maximum of 12 and has to be independently applied.

Method 1: A method in which PLMN-IdentityInfoList included in plmn-IdentityList in CellAccessRelatedInfo and plmn-IdentityList included in PLMN-IdentityInfoList are all limited to one, and the corresponding value does not count in the total number of limitations.

Method 2: A method in which PLMN-IdentityInfoList included in plmn-IdentityList in CellAccessRelatedInfo is limited to one, but the number of plmn-IdentityList included in PLMN-IdentityInfoList is reflected without limitation, and instead, all the signaled values do not count in the number of limitations. The following ASN.1 code has been added as a reference for explaining this.

```
CellAccessRelatedInfo ::=      SEQUENCE {
   plmn-IdentityList       PLMN-IdentityInfoList,
      cellReservedForOtherUse      ENUMERATED {true} OPTIONAL,      --
Need R
   ...,
   [[
      cellReservedForFutureUse-r16      ENUMERATED {true} OPTIONAL,
-- Need R
      npn-IdentityInfoList-r16      NPN-IdentityInfoList-r16 OPTIONAL      --
Need R
      ]]
}
``` non-IdentityInfoList
The npn-IdentityInfoList is used to configure a set of NPN-IdentityInfo elements. Each of those elements contains a list of one or more NPN Identities and additional information associated with those NPNs. The total number of PLMNs (identified by a PLMN identity in plmn -IdentityList), PNI-NPNs (identified by a PLMN identity and a CAG-ID), and SNPNs (identified by a PLMN identity and a NID) together in the PLMN-IdentityInfoList and NPN-IdentityInfoList does not exceed 12, except for the NPN-only cells. In case of NPN-only cells the PLMN-IdentityInfoList contains a single element that does not count to the limit of 12. The NPN index is defined as B + FFS.

Figure 1J:
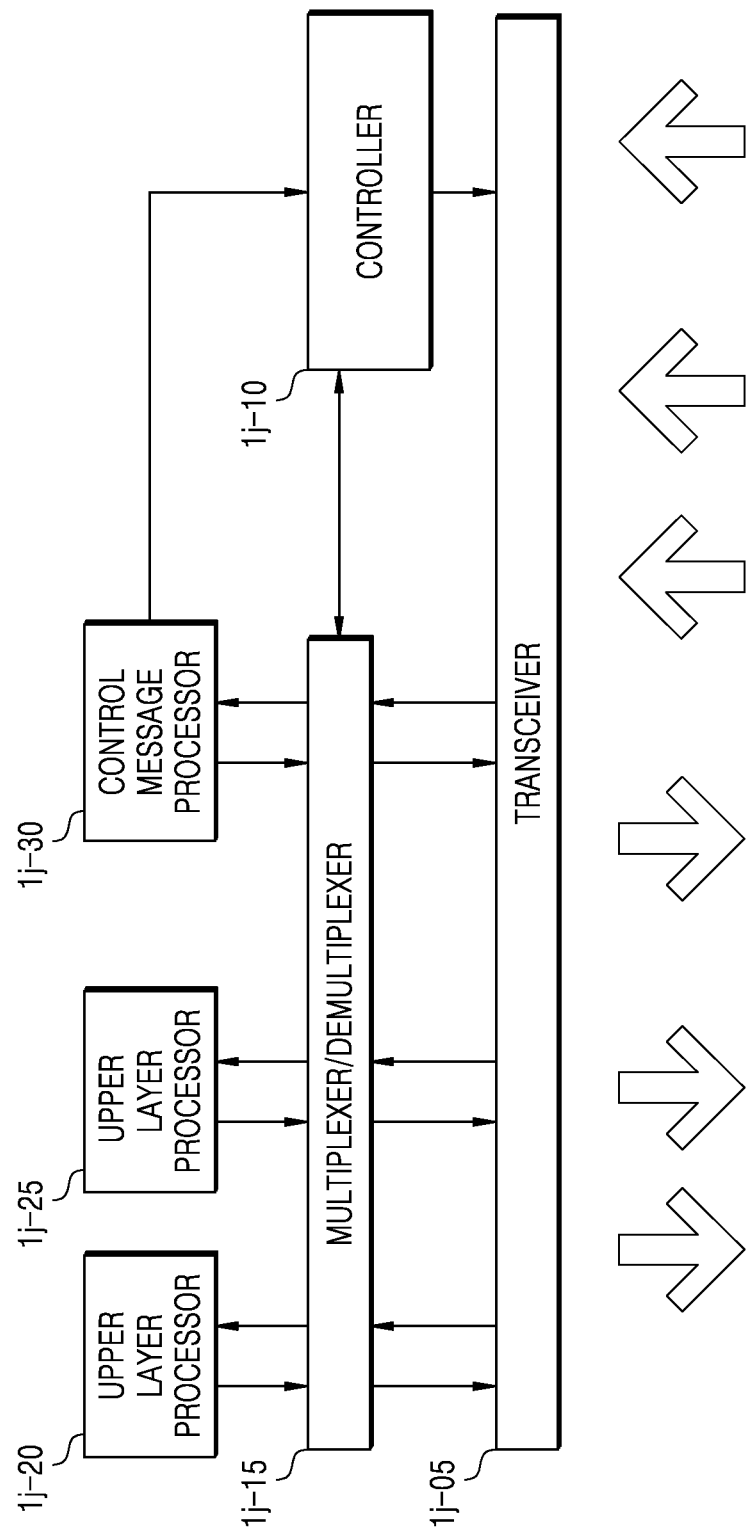
FIG. 1J is a block diagram illustrating an architecture of a UE, according to an embodiment of the disclosure.

FIG. 1J is a block diagram illustrating an architecture of a UE, according to an embodiment of the disclosure.

Referring to FIG. 1J, the UE according to an embodiment of the disclosure may include a transceiver 1*j*-05, a controller 1*j*-10, a multiplexer/demultiplexer 1*j*-15, a plurality of upper layer processors 1*j*-20 and 1*j*-25, and a control message processor 1*j*-30. Of course, the disclosure is not limited to the above example, and the UE may include fewer elements or more elements than the elements illustrated in FIG. 1J.

The transceiver 1*j*-05 receives data and a certain control signal through a forward channel of a serving cell, and transmits the data and the certain control signal through a reverse channel. When a plurality of serving cells are

```
      NPN-IdentityInfoList-r16 : =      SEQUENCE (SIZE (1..maxNPN-r16))
OF NPN-IdentityInfo-r16
      NPN-IdentityInfo-r16 ::=      SEQUENCE {
         npn-IdentityList-r16      SEQUENCE (SIZE (1..maxNPN-r16)) OF
NPN-Identity-r16,
         trackingAreaCode-r16      TrackingAreaCode,
         ranac-r16            RAN-AreaCode            OPTIONAL,      -- Need
R
         cellIdentity-r16         CellIdentity,
         cellReservedForOperatorUse-r16         ENUMERATED {reserved,
notReserved},
         ...
      }
      NPN-Identity-r16 ::=      CHOICE {
         pni-npn-r16            SEQUENCE {
            plmn-Identity-r16         PLMN-Identity,
            cag-IdentityList-r16         SEQUENCE (SIZE (1..maxNPN-r16)) OF
CAG-Identity-r16
         },
         snpn-r16            SEQUENCE {
            plmn-Identity         PLMN-Identity,
            nid-List-r16            SEQUENCE (SIZE (1..maxNPN-r16)) OF NID-
r16
         }
      }
      CAG-Identity-r16 ::=         BIT STRING (SIZE (32))
      NID-r16 ::=         BIT STRING (SIZE (52))
      PLMN-IdentityInfoList ::=         SEQUENCE (SIZE (1..maxPLMN)) OF
PLMN-IdentityInfo
      PLMN-IdentityInfo ::=         SEQUENCE {
         plmn-IdentityList         SEQUENCE (SIZE (1..maxPLMN)) OF PLMN-
Identity,
            trackingAreaCode            OPTIONAL,      -- Need R
            ranac         RAN-AreaCode            OPTIONAL,      -- Need
R
         cellIdentity         ,
         cellReservedForOperatorUse         ENUMERATED {reserved,
notReserved},
         ...,
         [[
         iab-Support-r16      ENUMERATED {true}         OPTIONAL
-- Need R
         ]]
      }
``` configured, the transceiver 1*j*-05 performs data transmission and reception and control signal transmission and reception through the serving cells.

The multiplexer/demultiplexer 1*j*-15 multiplexes data generated by the upper layer processors 1*j*-20 and 1*j*-25 or the control message processor 1*j*-30, or demultiplexes data received from the transceiver 1*j*-05, and transmits the multiplexed data or the demultiplexed data to the appropriate upper layer processor 1*j*-20 or 1*j*-25 or the control message processor 1*j*-30.

The control message processor 1*j*-30 may perform a necessary operation by transmitting and receiving a control message from a base station. A function of processing a control message such as a MAC control element (CE) and an RRC message may be included, and an operation of reporting CBR measurement values and receiving an RRC message for resource pool and UE operation may be included.

The upper layer processors 1*j*-20 and 1*j*-25 refer to DRBs and may be configured for each service. The upper layer processors 1*j*-20 and 1*j*-25 may process data generated from user services such as a file transfer protocol (FTP) or a voice over Internet protocol (VoIP) and transmit the processed data to the multiplexer/demultiplexer 1*j*-15, or may process data transmitted from the multiplexer/demultiplexer 1*j*-15 and transmit the processed data to an upper layer service application.

The controller 1*j*-10 may control the transceiver 1*j*-05 and the multiplexer/demultiplexer 1*j*-15 to check a scheduling command, for example, reverse grants, received through the transceiver 1*j*-05, and perform reverse transmission on an appropriate transmission resource at an appropriate timing.

The case in which the UE includes a plurality of blocks and the respective blocks perform different functions from each other has been described, but this is only an example, and the disclosure is not necessarily limited thereto. For example, the controller 1*j*-10 itself may perform the functions of the demultiplexer 1*j*-15.

Also, although not illustrated in FIG. 1J, the UE may further include a storage. The storage may store data such as basic programs, application programs, and configuration information for the operations of the UE. The storage may provide stored data in response to the request of the controller 1*j*-10. The storage may include a storage medium such as read-only memory (ROM), random access memory (RAM), hard disk, compact disc read-only memory (CD-ROM), and digital versatile disc (DVD), or any combination thereof. Also, the storage may include a plurality of memories.

Figure 1K:
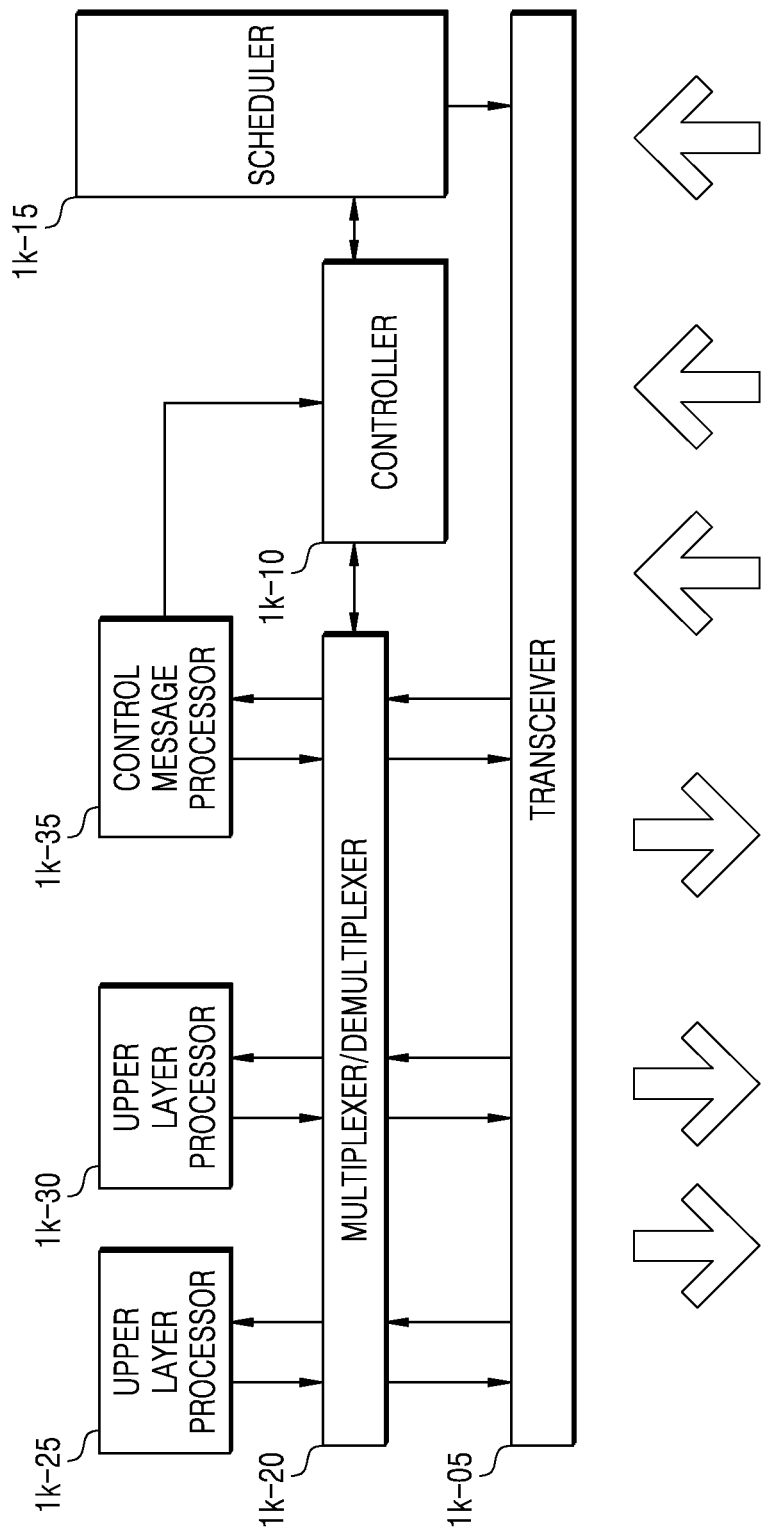
FIG. 1K is a block diagram illustrating an architecture of a base station, according to an embodiment of the disclosure.

FIG. 1K is a block diagram illustrating an architecture of a base station, according to an embodiment of the disclosure.

Referring to FIG. 1K, the base station may include a transceiver 1*k*-05, a controller 1*k*-10, a multiplexer/demultiplexer 1*k*-20, a control message processor 1*k*-35, a plurality of upper layer processors 1*k*-25 and 1*k*-30, and a scheduler 1*k*-15. Of course, the disclosure is not limited to the above example, and the base station may include fewer elements or more elements than the elements illustrated in FIG. 1K.

The transceiver 1*k*-05 transmits data and a certain control signal through a forward carrier and receives data and a certain control signal through a reverse carrier. When a plurality of carriers are configured, the transceiver 1*k*-05 performs data transmission and reception and control signal transmission and reception through the carriers.

The multiplexer/demultiplexer 1*k*-20 multiplexes data generated by the upper layer processors 1*k*-25 and 1*k*-30 or the control message processor 1*k*-35, or demultiplexes data received from the transceiver 1*k*-05, and transmits the multiplexed data or the demultiplexed data to the appropriate upper layer processor 1*k*-25 or 1*k*-30, the control message processor 1*k*-35, or the controller 1*k*-10.

The control message processor 1*k*-35 may receive an instruction from the controller 1*k*-10, generate a message to be transmitted to the UE, and transmit the message to a lower layer.

The upper layer processors 1*k*-25 and 1*k*-30 may be configured for each service of the UE, and may process data generated from user services such as an FTP or a VoIP and transmit the processed data to the multiplexer/demultiplexer 1*k*-20, or may process data transmitted from the multiplexer/demultiplexer 1*k*-20 and transmit the processed data to an upper layer service application.

The scheduler 1*k*-15 assigns transmission resources to the UE at an appropriate timing, considering buffer status of the UE, channel status, and active time of the UE, and processes signals that the UE transmits to the transceiver 1*k*-05, or transmits signals to the UE.

Also, although not illustrated in FIG. 1K, the base station may further include a storage. The storage may store data such as basic programs, application programs, and configuration information for the operations of the base station. In particular, the storage may store information about bearers allocated to the connected UE, measurement results reported from the connected UE, etc. Also, the storage may store information that is the criterion for determining whether to provide multiple connections to the UE or to stop multiple connections. The storage may provide stored data in response to the request of the controller 1*k*-10. The storage may include a storage medium such as ROM, RAM, hard disk, CD-ROM, and DVD, or any combination thereof. Also, the storage may include a plurality of memories.

In specific embodiments of the disclosure, the elements included in the disclosure have been expressed in the singular or plural form according to the suggested specific embodiments of the disclosure. However, the expression in the singular or plural form is appropriately selected according to the suggested situations for convenience of explanation and is not intended to limit the disclosure to the single or plural elements. Even when a certain element is expressed in the plural form, it may be provided with a single element, and even when a certain element is expressed in the singular form, it may be provided with a plurality of elements.

Although specific embodiments of the disclosure have been described in the detailed description of the disclosure, various modifications may be made without departing from the scope of the disclosure. Therefore, the scope of the disclosure should not be limited to the above-described embodiments of the disclosure and should be determined by the appended claims and the equivalents thereof.

The methods according to the embodiments of the disclosure, which are described in the claims or the specification, may be implemented as hardware, software, or a combination of hardware and software.

When implemented as software, a computer-readable storage medium storing one or more programs (software modules) may be provided. One or more programs stored in the computer-readable storage medium are configured to be executable by one or more processors in an electronic device. One or more programs include instructions that cause the electronic device to execute the methods according to the embodiments of the disclosure, which are described in the claims or the specification of the disclosure.

One or more programs (software modules, software, etc.) may be stored in RAM, non-volatile memory including flash memory, ROM, electrically erasable programmable read only memory (EEPROM), magnetic disc storage device, CD-ROM, DVD, other types of optical storage devices, or magnetic cassette. Alternatively, one or more programs may be stored in a memory provided by a combination of all or part of these devices. Also, each memory may include a plurality of configured memories.

Also, one or more programs may be stored in an attachable storage device that is accessible through a communication network such as Internet, intranet, local area network (LAN), wide LAN (WLAN), or storage area network (SAN), or communication network provided by a combination thereof. These storage devices may be connected through an external port to a device that performs the embodiments of the disclosure. Also, a separate storage on the communication network may access the device that performs the embodiment of the disclosure.

In specific embodiments of the disclosure, the elements included in the disclosure have been expressed in the singular or plural form according to the suggested specific embodiments of the disclosure. However, the expression in the singular or plural form is appropriately selected according to the suggested situations for convenience of explanation and is not intended to limit the disclosure to the single or plural elements. Even when a certain element is expressed in the plural form, it may be provided with a single element, and even when a certain element is expressed in the singular form, it may be provided with a plurality of elements.

The embodiments of the disclosure provide the detailed operating method of the network and the UE for accessing the non-public network in the mobile communication system. In addition, the embodiments of the disclosure provide the method and apparatus capable of effectively providing a service in the mobile communication system.

Although specific embodiments of the disclosure have been described in the detailed description of the disclosure, various modifications may be made without departing from the scope of the disclosure. Therefore, the scope of the disclosure should not be limited to the above-described embodiments of the disclosure and should be determined by the appended claims and the equivalents thereof. That is, it will be obvious to those of ordinary skill in the art that other modifications based on the technical idea of the disclosure may be made. In addition, the respective embodiments of the disclosure may be operated in combination with each other as necessary. For example, some portions of the methods proposed in the disclosure may be combined with each other so that the base station and the UE are operated. Also, although the above-described embodiments of the disclosure have been presented based on the 5G and NR systems, other modifications based on the technical idea of the embodiments of the disclosure may also be applied to other systems such as LTE, LTE-A, LTE-A-Pro systems.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method, performed by a user equipment (UE), for accessing a cell, the method comprising:
   receiving, from a base station, a system information block 1 (SIB1) comprising cellAccessRelatedinfo;
   selecting a public land mobile network (PLMN);
   selecting a cell, based on a closed access group (CAG) identification (ID) broadcast from the base station and the selected PLMN;
   identifying whether a tracking area (TA) update is required, based on the selected cell and a non-public network (npn)-IdentityInfoList included in the cellAccessRelatedinfo;
   in case that the TA update is required, performing the TA update;
   transmitting, to the base station, a radio resource control (RRC) setup request message;
   receiving, from the base station, an RRC setup message; and
   transmitting, to the base station, an RRC setup complete message.

2. The method of claim 1, wherein the npn-IdentityInfoList comprises:
   a npn-IdentityList;
   a trackingAreaCode; and
   a cellIdentity.

3. The method of claim 1, further comprising:
   identifying whether a radio access network (RAN)-based Notification Area (RNA) update is required, based on the selected cell and the npn-IdentityInfoList included in the cellAccessRelatedinfo; and
   in case that the RNA update is required, performing the RNA update.

4. The method of claim 1,
   wherein the RRC setup complete message comprises a selectedPLMN-Identity, and
   wherein the selectedPLMN-Identity is set to the selected PLMN included in the npn-IdentityInfoList.

5. A user equipment (UE) for accessing a cell, the UE comprising:
   a memory;
   a transceiver; and
   a processor coupled with the memory and the transceiver and configured to:
     receive, from a base station, a system information block 1 (SIB1) comprising cellAccessRelatedinfo,
     select a public land mobile network (PLMN),
     select a cell, based on a closed access group (CAG) identification (ID) broadcast from the base station and the selected PLMN,
     identify whether a tracking area (TA) update is required, based on the selected cell and a non-public network (npn)-IdentityInfoList included in the cellAccessRelatedinfo,
     in case that the TA update is required, perform the TA update,
     transmit, to the base station, a radio resource control (RRC) setup request message,
     receive, from the base station, an RRC setup message, and
     transmit, to the base station, an RRC setup complete message.

6. The UE of claim 5, wherein the npn-IdentityInfoList comprises:
   a npn-IdentityList;
   a trackingAreaCode; and
   a cellIdentity.

7. The UE of claim 5, the processor is further configured to:
   identify whether a radio access network (RAN)-based Notification Area (RNA) is required, based on the selected cell and the npn-IdentityInfoList included in the cellAccessRelatedinfo; and
   in case that the RNA update is required, perform the RNA update.

8. The UE of claim 5,
wherein the RRC setup complete message comprises a selectedPLMN-Identity, and
wherein the selectedPLMN-Identity is set to the selected PLMN included in the npn-IdentityInfoList.

* * * * *